(12) United States Patent
Nagata et al.

(10) Patent No.: US 10,136,451 B2
(45) Date of Patent: *Nov. 20, 2018

(54) USER TERMINAL, RADIO BASE STATION AND ADAPTIVE MODULATION AND CODING METHOD

(71) Applicant: NTT DOCOMO, INC., Tokyo (JP)

(72) Inventors: Satoshi Nagata, Tokyo (JP); Qin Mu, Beijing (CN); Liu Liu, Beijing (CN); Yu Jiang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,968

(22) Filed: Apr. 25, 2017

(65) Prior Publication Data

US 2017/0231000 A1    Aug. 10, 2017

Related U.S. Application Data

(63) Continuation of application No. 14/763,611, filed as application No. PCT/JP2014/050953 on Jan. 20, 2014, now Pat. No. 9,667,361.

(30) Foreign Application Priority Data

Jan. 29, 2013  (JP) ................. 2013-014597
Sep. 6, 2013   (JP) ................. 2013-185184

(51) Int. Cl.
*H04W 4/00*  (2018.01)
*H04W 74/00* (2009.01)
(Continued)

(52) U.S. Cl.
CPC ....... *H04W 74/008* (2013.01); *H04L 27/2275* (2013.01); *H04L 27/2692* (2013.01);
(Continued)

(58) Field of Classification Search
None
See application file for complete search history.

(56) References Cited

U.S. PATENT DOCUMENTS 7,933,238 B2   4/2011  Sartori et al.
8,422,583 B2   4/2013  Li et al.
(Continued)

FOREIGN PATENT DOCUMENTS

CN   101651515 A   2/2010
CN   102611536 A   7/2012
(Continued)

OTHER PUBLICATIONS

International Search Report issued in corresponding PCT Application No. PCT/JP2014/050953 dated Feb. 18, 2014 (2 pages).
Fujitsu; "Evaluaton assumptions for introduction of DL higher order modulation to small cell"; 3GPP TSG RAN WG1 Meeting #72, R1-130172, St. Julians, Malta; Jan. 28-Feb. 1, 2013 (6 pages).
Hitachi Ltd.; "Views on 256QAM for small cell enhancement"; 3GPP TSG-RAN WG1 #72, R1-130341, Malta; Jan. 28-Feb. 1, 2013 (4 pages).
(Continued)

*Primary Examiner* — Anh-Vu Ly
(74) *Attorney, Agent, or Firm* — Osha Liang LLP

(57) ABSTRACT

In one aspect, the adaptive modulation and coding method includes, in a user terminal, receiving a modulation and coding scheme (MCS) index, acquiring a modulation order corresponding to the received MCS index as a modulation order of a downlink shared channel, from a first table in which MCS indexes are associated with modulation orders including 8 and transport block size (TBS) indexes, and a second table is provided in which MCS indexes are associated with modulation orders of less than 8 and TBS indexes, and the first table is provided by puncturing a combination of a modulation order and a TBS index in the second table so that the first table and the second table are equal in a number of bits for an MCS index. In other aspects, a user terminal and a radio base station are provided.

13 Claims, 43 Drawing Sheets

(51) Int. Cl.
*H04L 27/227* (2006.01)
*H04L 27/26* (2006.01)
*H04W 72/04* (2009.01)
*H04W 72/12* (2009.01)

(52) U.S. Cl.
CPC ....... *H04W 72/042* (2013.01); *H04W 72/048* (2013.01); *H04W 72/1289* (2013.01)

(56) References Cited

U.S. PATENT DOCUMENTS

| | | | |
|---|---|---|---|
| 9,667,361 B2* | 5/2017 | Nagata | H04L 1/00 370/328 |
| 2010/0195614 A1* | 8/2010 | Nimbalker | H04W 72/1289 370/330 |
| 2010/0238845 A1 | 9/2010 | Love et al. | |
| 2011/0235604 A1 | 9/2011 | Inoue et al. | |
| 2012/0058730 A1 | 3/2012 | Jitsukawa et al. | |
| 2013/0286881 A1 | 10/2013 | Ding et al. | |
| 2014/0169300 A1 | 6/2014 | Kim et al. | |
| 2014/0192732 A1 | 7/2014 | Chen et al. | |
| 2015/0036590 A1 | 2/2015 | Lahetkangas et al. | |
| 2015/0358111 A1 | 12/2015 | Marinier et al. | |
| 2015/0365181 A1 | 12/2015 | Nagata et al. | |
| 2017/0295593 A1* | 10/2017 | Kim | H04W 72/1289 370/328 |

FOREIGN PATENT DOCUMENTS

| | | |
|---|---|---|
| CN | 102624481 A | 8/2012 |
| CN | 102624501 A | 8/2012 |
| EP | 2480023 A1 | 7/2012 |
| JP | 5852616 B2 | 2/2016 |
| WO | 2008/109269 A2 | 9/2008 |
| WO | 2010/061825 A1 | 6/2010 |
| WO | 2010/131354 A1 | 11/2010 |

OTHER PUBLICATIONS

3GPP TS 36.213 V10.4.0; "3rd Generation Partnership Project; Technical Specification Group Radio Access Network; Evolved Universal Terrestrial Radio Access (E-UTRA); Physical layer procedures (Release 10)"; Dec. 2011 (125 pages).
Office Action dated Aug. 23, 2016, in corresponding Japanese Patent Application No. 2015-237455 (with translation) (13 pages).
3GPP TSG RAN WG1 Meeting #72, "On Small Cell Enhancement for Improved Spectral Efficiency", R1-130311, St. Julian's, Malta, Jan. 28-Feb. 1, 2013 (4 pages).
3GPP TSG RAN WG1 Meeting #72, "Consideration of high order modulation for small cell", R1-130136, St. Julian's, Malta, Jan. 28-Feb. 1, 2013 (6 pages).
3GPP TSG-RAN WG1 Meeting 72bis, "Discussion on 258QAM for Downlink in Small Cell Deployments", R1-131328, Apr. 15-19, 2013, Chicago, USA (6 pages).
Extended Search Report issued in corresponding European Application No. 14746085.1, dated Oct. 11, 2016 (8 pages).
Office Action issued in corresponding Japanese Application No. 2015-237455, dated Nov. 29, 2016 (14 pages).
Office Action issued in the counterpart Japanese Patent Application No. 2015-237455, dated Jun. 6, 2017 (8 pages).
Office Action dated Feb. 14, 2017, in corresponding Japanese Patent Application No. 2015-237455 (12 pages).
Office Action issued in corresponding European Patent Application No. 14746085.1, dated Dec. 8, 2017 (5 pages).
Office Action issued in corresponding Chinese Application No. 201480006150.1, dated Feb. 2, 2018 (32 pages).
Office Action issued in corresponding Indonesian Patent Application No. P00201505031, dated Apr. 12, 2018 (4 pages).
Office Action issued in corresponding European Patent Application No. 14746085.1, dated Jun. 14, 2018 (4 pages).

* cited by examiner

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG.2

| MCS INDEX | MODULATION ORDER | TBS INDEX |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | RESERVED |
| 30 | 4 | |
| 31 | 6 | |

FIG.3

| TBS | 1 | 2 | 3 | 4 | N_PRB 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 584 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

FIG.4

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |
| 16 | 256 QAM | 772 | 6.0313 |
| 17 | 256 QAM | 873 | 6.7969 |
| 18 | 256 QAM | 948 | 7.3984 |
| 19 | 256 QAM | 975 | 7.6171 |

FIG.7

| CQI INDEX | UE FEEDBACK INDEX |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 0 |
| 17 | 1 |
| 18 | 2 |
| 19 | 3 |

SUB-TABLE 1: CQI INDEX 0–15
SUB-TABLE 2: CQI INDEX 4–19

FIG.11

| MCS INDEX | MODULATION ORDER | TBS INDEX | SPECTRAL EFFICIENCY | COMMENTS | CODE RATE |
|---|---|---|---|---|---|
| 0 | 2 | 0 | 0.2344 | from CQI table (CQI index=2) | 0.1171875 |
| 1 | 2 | 1 | 0.3057 | Average Efficiency | 0.15332031 |
| 2 | 2 | 2 | 0.377 | from CQI table (CQI index=3) | 0.18847656 |
| 3 | 2 | 3 | 0.4893 | Average Efficiency | 0.24511719 |
| 4 | 2 | 4 | 0.6016 | from CQI table (CQI index=4) | 0.30078125 |
| 5 | 2 | 5 | 0.7393 | Average Efficiency | 0.37011719 |
| 6 | 2 | 6 | 0.877 | from CQI table (CQI index=5) | 0.43847656 |
| 7 | 2 | 7 | 1.0264 | Average Efficiency | 0.51367188 |
| 8 | 2 | 8 | 1.1758 | from CQI table (CQI index=6) | 0.58789063 |
| 9 | 2 | 9 | 1.3262 | Average Efficiency | 0.66308594 |
| 10 | 4 | 9 | 1.3262 | overlap | 0.33203125 |
| 11 | 4 | 10 | 1.4766 | from CQI table (CQI index=7) | 0.36914063 |
| 12 | 4 | 11 | 1.69535 | Average Efficiency | 0.42382813 |
| 13 | 4 | 12 | 1.9141 | from CQI table (CQI index=8) | 0.47851563 |
| 14 | 4 | 13 | 2.1602 | Average Efficiency | 0.54003906 |
| 15 | 4 | 14 | 2.4063 | from CQI table (CQI index=9) | 0.6015625 |
| 16 | 4 | 15 | 2.5684 | Average Efficiency | 0.64257813 |
| 17 | 6 | 15 | 2.5684 | overlap | 0.42773438 |
| 18 | 6 | 16 | 2.7305 | from CQI table (CQI index=10) | 0.45507813 |
| 19 | 6 | 17 | 3.0264 | Average Efficiency | 0.50488281 |
| 20 | 6 | 18 | 3.3223 | from CQI table (CQI index=11) | 0.55371094 |
| 21 | 6 | 19 | 3.6123 | Average Efficiency | 0.60156255 |
| 22 | 6 | 20 | 3.9023 | from CQI table (CQI index=12) | 0.65039063 |
| 23 | 6 | 21 | 4.21285 | Average Efficiency | 0.70214844 |
| 24 | 6 | 22 | 4.5234 | from CQI table (CQI index=13) | 0.75390625 |
| 25 | 6 | 23 | 4.8193 | Average Efficiency | 0.80273438 |
| 26 | 6 | 24 | 5.1152 | from CQI table (CQI index=14) | 0.85253906 |
| 27 | 6 | 25 | 5.33495 | Average Efficiency | 0.88867188 |
| 28 | 6 | 26 | 5.5547 | from CQI table (CQI index=15) | 0.92578125 |
| 29 | 2 | reserved | | | |
| 30 | 4 | reserved | | | |
| 31 | 6 | reserved | | | |
| 32 | 8 | 27 | 5.7930 | Average Efficiency | 0.7241 |
| 33 | 8 | 28 | 6.0313 | from CQI table (CQI index=16) | 0.75390625 |
| 34 | 8 | 29 | 6.4141 | Average Efficiency | 0.8018 |
| 35 | 8 | 30 | 6.7969 | from CQI table (CQI index=17) | 0.85253906 |
| 36 | 8 | 31 | 7.0976 | Average Efficiency | 0.8872 |
| 37 | 8 | 32 | 7.3984 | from CQI table (CQI index=18) | 0.92578125 |
| 38 | 8 | 33 | 7.5077 | Average Efficiency | 0.9385 |
| 39 | 8 | 34 | 7.6171 | from CQI table (CQI index=19) | 0.951484375 |

EXTENDED ACCORDING TO THE NEW CQI TABLE (rows 32–39)

FIG.14

| MCS Index |
|---|
| 0 |
| 1 |
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |
| 17 |
| 18 |
| 19 |
| 20 |
| 21 |
| 22 |
| 23 |
| 24 |
| 25 |
| 26 |
| 27 |
| 28 |
| 29 |
| 30 |
| 31 |
| 32 |
| 33 |
| 34 |
| 35 |
| 36 |
| 37 |
| 38 |
| 39 |

SUB-TABLE 1: MCS Index 0–31

SUB-TABLE 2: MCS Index 8–39

FIG.17

| MCS INDEX | MODULATION ORDER | TBS INDEX |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | RESERVED |
| 30 | 4 | |
| 31 | 6 | |
| 32 | 8 | 27 |
| 33 | 8 | 28 |
| 34 | 8 | 29 |
| 35 | 8 | 30 |
| 36 | 8 | 31 |
| 37 | 8 | 32 |
| 38 | 8 | 33 |
| 39 | 8 | 34 |

LINEARLY PUNCTURED

FIG.19

| MCS INDEX | MODULATION ORDER | TBS INDEX |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | RESERVED |
| 30 | 4 | |
| 31 | 6 | |
| 32 | 8 | 27 |
| 33 | 8 | 28 |
| 34 | 8 | 29 |
| 35 | 8 | 30 |
| 36 | 8 | 31 |
| 37 | 8 | 32 |
| 38 | 8 | 33 |
| 39 | 8 | 34 |

NON-LINEARLY PUNCTURED

FIG.20

| TBS INDEX | TARGET CR | N_PRB | | | | | | | | | |
|---|---|---|---|---|---|---|---|---|---|---|---|
| | | 1 | 2 | 3 | 4 | 5 | 6 | 7 | 8 | 9 | 10 |
| 27 | 0.7241 | 672 | 1368 | 2064 | 2760 | 3448 | 4144 | 4840 | 5536 | 6232 | 6928 |
| 28 | 0.7539 | 696 | 1424 | 2144 | 2872 | 3592 | 4320 | 5040 | 5768 | 6488 | 7216 |
| 29 | 0.8018 | 744 | 1512 | 2288 | 3056 | 3824 | 4592 | 5368 | 6136 | 6904 | 7672 |
| 30 | 0.8525 | 792 | 1616 | 2432 | 3248 | 4072 | 4888 | 5704 | 6520 | 7344 | 8160 |
| 31 | 0.8872 | 824 | 1680 | 2528 | 3384 | 4232 | 5088 | 5936 | 6792 | 7640 | 8496 |
| 32 | 0.9258 | 864 | 1752 | 2640 | 3528 | 4416 | 5312 | 6200 | 7088 | 7976 | 8864 |
| 33 | 0.9385 | 880 | 1776 | 2680 | 3576 | 4480 | 5384 | 6280 | 7184 | 8088 | 8984 |
| 34 | 0.9521 | 888 | 1808 | 2720 | 3632 | 4544 | 5464 | 6376 | 7288 | 8200 | 9120 |

FIG.21

| TBS INDEX | TARGET CR | N_PRB | | | | | | | | | |
|---|---|---|---|---|---|---|---|---|---|---|---|
| | | 11 | 12 | 13 | 14 | 15 | 16 | 17 | 18 | 19 | 20 |
| 27 | 0.7241 | 7624 | 8320 | 9016 | 9704 | 10400 | 11096 | 11792 | 12488 | 13184 | 13880 |
| 28 | 0.7539 | 7936 | 8664 | 9384 | 10112 | 10832 | 11552 | 12280 | 13000 | 13728 | 14448 |
| 29 | 0.8018 | 8440 | 9216 | 9984 | 10752 | 11520 | 12288 | 13064 | 13832 | 14600 | 15368 |
| 30 | 0.8525 | 8976 | 9800 | 10616 | 11432 | 12256 | 13072 | 13888 | 14704 | 15528 | 16344 |
| 31 | 0.8872 | 9344 | 10200 | 11048 | 11896 | 12752 | 13600 | 14456 | 15304 | 16160 | 17008 |
| 32 | 0.9258 | 9752 | 10640 | 11528 | 12416 | 13304 | 14200 | 15088 | 15976 | 16864 | 17752 |
| 33 | 0.9385 | 9888 | 10784 | 11688 | 12592 | 13488 | 14392 | 15296 | 16192 | 17096 | 17992 |
| 34 | 0.9521 | 10032 | 10944 | 11856 | 12776 | 13688 | 14600 | 15512 | 16432 | 17344 | 18256 |

FIG.22

| TBS INDEX | TARGET CR | N_PRB | | | | | | | | | |
|---|---|---|---|---|---|---|---|---|---|---|---|
| | | 21 | 22 | 23 | 24 | 25 | 26 | 27 | 28 | 29 | 30 |
| 27 | 0.7241 | 14576 | 15272 | 15968 | 16656 | 17352 | 18048 | 18744 | 19440 | 20136 | 20832 |
| 28 | 0.7539 | 15176 | 15896 | 16624 | 17344 | 18072 | 18792 | 19520 | 20240 | 20968 | 21688 |
| 29 | 0.8018 | 16144 | 16912 | 17680 | 18448 | 19216 | 19992 | 20760 | 21528 | 22296 | 23064 |
| 30 | 0.8525 | 17160 | 17984 | 18800 | 19616 | 20440 | 21256 | 22072 | 22888 | 23712 | 24528 |
| 31 | 0.8872 | 17864 | 18712 | 19568 | 20416 | 21272 | 22120 | 22976 | 23824 | 24672 | 25528 |
| 32 | 0.9258 | 18640 | 19528 | 20416 | 21304 | 22192 | 23080 | 23976 | 24864 | 25752 | 26640 |
| 33 | 0.9385 | 18896 | 19800 | 20696 | 21600 | 22504 | 23400 | 24304 | 25200 | 26104 | 27008 |
| 34 | 0.9521 | 19168 | 20088 | 21000 | 21912 | 22824 | 23744 | 24656 | 25568 | 26480 | 27400 |

FIG.23

| TBS INDEX | TARGET CR | N_PRB | | | | | | | | | |
|---|---|---|---|---|---|---|---|---|---|---|---|
| | | 31 | 32 | 33 | 34 | 35 | 36 | 37 | 38 | 39 | 40 |
| 27 | 0.7241 | 21528 | 22224 | 22912 | 23608 | 24304 | 25000 | 25696 | 26392 | 27088 | 27784 |
| 28 | 0.7539 | 22416 | 23136 | 23856 | 24584 | 25304 | 26032 | 26752 | 27480 | 28200 | 28928 |
| 29 | 0.8018 | 23840 | 24608 | 25376 | 26144 | 26920 | 27688 | 28456 | 29224 | 29992 | 30768 |
| 30 | 0.8525 | 25344 | 26168 | 26984 | 27800 | 28624 | 29440 | 30256 | 31072 | 31896 | 32712 |
| 31 | 0.8872 | 26376 | 27232 | 28080 | 28936 | 29784 | 30640 | 31488 | 32344 | 33192 | 34048 |
| 32 | 0.9258 | 27528 | 28416 | 29304 | 30192 | 31080 | 31968 | 32864 | 33752 | 34640 | 35528 |
| 33 | 0.9385 | 27904 | 28808 | 29704 | 30608 | 31512 | 32408 | 33312 | 34216 | 35112 | 36016 |
| 34 | 0.9521 | 28312 | 29224 | 30136 | 31056 | 31968 | 32880 | 33792 | 34712 | 35624 | 36536 |

FIG.24

| TBS INDEX | TARGET CR | N_PRB | | | | | | | | | |
|---|---|---|---|---|---|---|---|---|---|---|---|
| | | 41 | 42 | 43 | 44 | 45 | 46 | 47 | 48 | 49 | 50 |
| 27 | 0.7241 | 28480 | 29168 | 29864 | 30560 | 31256 | 31952 | 32648 | 33344 | 34040 | 34736 |
| 28 | 0.7539 | 29648 | 30376 | 31096 | 31824 | 32544 | 33272 | 33992 | 34712 | 35440 | 36160 |
| 29 | 0.8018 | 31536 | 32304 | 33072 | 33848 | 34616 | 35384 | 36152 | 36920 | 37696 | 38464 |
| 30 | 0.8525 | 33528 | 34352 | 35168 | 35984 | 36808 | 37624 | 38440 | 39256 | 40080 | 40896 |
| 31 | 0.8872 | 34896 | 35744 | 36600 | 37448 | 38304 | 39152 | 40008 | 40856 | 41712 | 42560 |
| 32 | 0.9258 | 36416 | 37304 | 38192 | 39080 | 39968 | 40856 | 41752 | 42640 | 43528 | 44416 |
| 33 | 0.9385 | 36912 | 37816 | 38720 | 39616 | 40520 | 41424 | 42320 | 43224 | 44120 | 45024 |
| 34 | 0.9521 | 37448 | 38368 | 39280 | 40192 | 41104 | 42024 | 42936 | 43848 | 44760 | 45680 |

FIG.25

| TBS INDEX | TARGET CR | N_PRB | | | | | | | | | |
|---|---|---|---|---|---|---|---|---|---|---|---|
| | | 51 | 52 | 53 | 54 | 55 | 56 | 57 | 58 | 59 | 60 |
| 27 | 0.7241 | 35424 | 36120 | 36816 | 37512 | 38208 | 38904 | 39600 | 40296 | 40992 | 41688 |
| 28 | 0.7539 | 36888 | 37608 | 38336 | 39056 | 39784 | 40504 | 41232 | 41952 | 42680 | 43400 |
| 29 | 0.8018 | 39232 | 40000 | 40768 | 41544 | 42312 | 43080 | 43848 | 44624 | 45392 | 46160 |
| 30 | 0.8525 | 41712 | 42536 | 43352 | 44168 | 44992 | 45808 | 46624 | 47440 | 48264 | 49080 |
| 31 | 0.8872 | 43416 | 44264 | 45120 | 45968 | 46824 | 47672 | 48520 | 49376 | 50224 | 51080 |
| 32 | 0.9258 | 45304 | 46192 | 47080 | 47968 | 48856 | 49744 | 50632 | 51528 | 52416 | 53304 |
| 33 | 0.9385 | 45928 | 46824 | 47728 | 48624 | 49528 | 50432 | 51328 | 52232 | 53136 | 54032 |
| 34 | 0.9521 | 46592 | 47504 | 48416 | 49336 | 50248 | 51160 | 52072 | 52992 | 53904 | 54816 |

FIG.26

| TBS INDEX | TARGET CR | N_PRB | | | | | | | | | |
|---|---|---|---|---|---|---|---|---|---|---|---|
| | | 61 | 62 | 63 | 64 | 65 | 66 | 67 | 68 | 69 | 70 |
| 27 | 0.7241 | 42376 | 43072 | 43768 | 44464 | 45160 | 45856 | 46552 | 47248 | 47944 | 48632 |
| 28 | 0.7539 | 44128 | 44848 | 45568 | 46296 | 47016 | 47744 | 48464 | 49192 | 49912 | 50640 |
| 29 | 0.8018 | 46928 | 47696 | 48472 | 49240 | 50008 | 50776 | 51544 | 52320 | 53088 | 53856 |
| 30 | 0.8525 | 49896 | 50720 | 51536 | 52352 | 53176 | 53992 | 54808 | 55624 | 56448 | 57264 |
| 31 | 0.8872 | 51928 | 52784 | 53632 | 54488 | 55336 | 56192 | 57040 | 57896 | 58744 | 59592 |
| 32 | 0.9258 | 54192 | 55080 | 55968 | 56856 | 57744 | 58632 | 59520 | 60416 | 61304 | 62192 |
| 33 | 0.9385 | 54936 | 55832 | 56736 | 57640 | 58536 | 59440 | 60344 | 61240 | 62144 | 63040 |
| 34 | 0.9521 | 55728 | 56648 | 57560 | 58472 | 59384 | 60304 | 61216 | 62128 | 63040 | 63960 |

FIG.27

| TBS INDEX | TARGET CR | N_PRB | | | | | | | | | |
|---|---|---|---|---|---|---|---|---|---|---|---|
| | | 71 | 72 | 73 | 74 | 75 | 76 | 77 | 78 | 79 | 80 |
| 27 | 0.7241 | 49328 | 50024 | 50720 | 51416 | 52112 | 52808 | 53504 | 54200 | 54888 | 55584 |
| 28 | 0.7539 | 51360 | 52088 | 52808 | 53536 | 54256 | 54984 | 55704 | 56432 | 57152 | 57872 |
| 29 | 0.8018 | 54624 | 55400 | 56168 | 56936 | 57704 | 58472 | 59248 | 60016 | 60784 | 61552 |
| 30 | 0.8525 | 58080 | 58904 | 59720 | 60536 | 61360 | 62176 | 62992 | 63808 | 64632 | 65448 |
| 31 | 0.8872 | 60448 | 61296 | 62152 | 63000 | 63856 | 64704 | 65560 | 66408 | 67264 | 68112 |
| 32 | 0.9258 | 63080 | 63968 | 64856 | 65744 | 66632 | 67520 | 68408 | 69296 | 70192 | 71080 |
| 33 | 0.9385 | 63944 | 64848 | 65744 | 66648 | 67552 | 68448 | 69352 | 70248 | 71152 | 72056 |
| 34 | 0.9521 | 64872 | 65784 | 66696 | 67616 | 68528 | 69440 | 70352 | 71272 | 72184 | 73096 |

FIG.28

| TBS INDEX | TARGET CR | N_PRB | | | | | | | | | |
|---|---|---|---|---|---|---|---|---|---|---|---|
| | | 81 | 82 | 83 | 84 | 85 | 86 | 87 | 88 | 89 | 90 |
| 27 | 0.7241 | 56280 | 56976 | 57672 | 58368 | 59064 | 59760 | 60456 | 61144 | 61840 | 62536 |
| 28 | 0.7539 | 58600 | 59320 | 60048 | 60768 | 61496 | 62216 | 62944 | 63664 | 64392 | 65112 |
| 29 | 0.8018 | 62320 | 63096 | 63864 | 64632 | 65400 | 66176 | 66944 | 67712 | 68480 | 69248 |
| 30 | 0.8525 | 66264 | 67088 | 67904 | 68720 | 69544 | 70360 | 71176 | 71992 | 72816 | 73632 |
| 31 | 0.8872 | 68968 | 69816 | 70672 | 71520 | 72368 | 73224 | 74072 | 74928 | 75776 | 76632 |
| 32 | 0.9258 | 71968 | 72856 | 73744 | 74632 | 75520 | 76408 | 77296 | 78184 | 79080 | 79968 |
| 33 | 0.9385 | 72952 | 73856 | 74752 | 75656 | 76560 | 77456 | 78360 | 79264 | 80160 | 81064 |
| 34 | 0.9521 | 74008 | 74928 | 75840 | 76752 | 77664 | 78584 | 79496 | 80408 | 81320 | 82240 |

FIG.29

| TBS INDEX | TARGET CR | N_PRB | | | | | | | | | |
|---|---|---|---|---|---|---|---|---|---|---|---|
| | | 91 | 92 | 93 | 94 | 95 | 96 | 97 | 98 | 99 | 100 |
| 27 | 0.7241 | 63232 | 63928 | 64624 | 65320 | 66016 | 66712 | 67408 | 68096 | 68792 | 69488 |
| 28 | 0.7539 | 65840 | 66560 | 67288 | 68008 | 68728 | 69456 | 70176 | 70904 | 71624 | 72352 |
| 29 | 0.8018 | 70024 | 70792 | 71560 | 72328 | 73104 | 73872 | 74640 | 75408 | 76176 | 76952 |
| 30 | 0.8525 | 74448 | 75272 | 76088 | 76904 | 77728 | 78544 | 79360 | 80176 | 81000 | 81816 |
| 31 | 0.8872 | 77480 | 78336 | 79184 | 80040 | 80888 | 81744 | 82592 | 83440 | 84296 | 85144 |
| 32 | 0.9258 | 80856 | 81744 | 82632 | 83520 | 84408 | 85296 | 86184 | 87072 | 87968 | 88856 |
| 33 | 0.9385 | 81960 | 82864 | 83768 | 84664 | 85568 | 86472 | 87368 | 88272 | 89168 | 90072 |
| 34 | 0.9521 | 83152 | 84064 | 84976 | 85896 | 86808 | 87720 | 88632 | 89552 | 90464 | 91376 |

FIG.30

| TBS INDEX | TARGET CR | N_PRB | | | | | | | | | |
|---|---|---|---|---|---|---|---|---|---|---|---|
| | | 101 | 102 | 103 | 104 | 105 | 106 | 107 | 108 | 109 | 110 |
| 27 | 0.7241 | 70184 | 70880 | 71576 | 72272 | 72968 | 73664 | 74352 | 75048 | 75744 | 76440 |
| 28 | 0.7539 | 73072 | 73800 | 74520 | 75248 | 75968 | 76696 | 77416 | 78144 | 78864 | 79584 |
| 29 | 0.8018 | 77720 | 78488 | 79256 | 80024 | 80800 | 81568 | 82336 | 83104 | 83880 | 84648 |
| 30 | 0.8525 | 82632 | 83456 | 84272 | 85088 | 85912 | 86728 | 87544 | 88360 | 89184 | 90000 |
| 31 | 0.8872 | 86000 | 86848 | 87704 | 88552 | 89408 | 90256 | 91112 | 91960 | 92816 | 93664 |
| 32 | 0.9258 | 89744 | 90632 | 91520 | 92408 | 93296 | 94184 | 95072 | 95960 | 96848 | 97744 |
| 33 | 0.9385 | 90976 | 91872 | 92776 | 93672 | 94576 | 95480 | 96376 | 97280 | 98184 | 99080 |
| 34 | 0.9521 | 92288 | 93208 | 94120 | 95032 | 95944 | 96864 | 97776 | 98688 | 99600 | 100520 |

FIG.31

Used by cell edge UE

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |
| 16 | 256 QAM | 772 | 6.0312 |
| 17 | 256 QAM | 873 | 6.7969 |
| 18 | 256 QAM | 948 | 7.3984 |
| 19 | 256 QAM | 975 | 7.6171 |

PUNCTURED

| MCS INDEX | MODULATION ORDER | TBS INDEX |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | RESERVED |
| 30 | 4 | RESERVED |
| 31 | 6 | RESERVED |
| 32 | 8 | 27 |
| 33 | 8 | 28 |
| 34 | 8 | 29 |
| 35 | 8 | 30 |
| 36 | 8 | 31 |
| 37 | 8 | 32 |
| 38 | 8 | 33 |
| 39 | 8 | 34 |

PUNCTURED

FIG.40B

| MCS INDEX | MODULATION ORDER | TBS INDEX |
|---|---|---|
| 0 | 8 | 27 |
| 1 | 2 | 1 |
| 2 | 2 | 2 |
| 3 | 2 | 3 |
| 4 | 8 | 28 |
| 5 | 2 | 5 |
| 6 | 2 | 6 |
| 7 | 2 | 7 |
| 8 | 8 | 29 |
| 9 | 2 | 9 |
| 10 | 4 | 9 |
| 11 | 4 | 10 |
| 12 | 8 | 30 |
| 13 | 4 | 12 |
| 14 | 4 | 13 |
| 15 | 4 | 14 |
| 16 | 8 | 31 |
| 17 | 6 | 15 |
| 18 | 6 | 16 |
| 19 | 6 | 17 |
| 20 | 8 | 32 |
| 21 | 6 | 19 |
| 22 | 6 | 20 |
| 23 | 6 | 21 |
| 24 | 8 | 33 |
| 25 | 6 | 23 |
| 26 | 6 | 24 |
| 27 | 6 | 25 |
| 28 | 8 | 34 |
| 29 | 2 | RESERVED |
| 30 | 4 | |
| 31 | 6 | |

LINEARLY REPLACED

FIG.41

| MCS INDEX | MODULATION ORDER | TBS INDEX |
|---|---|---|
| 0 | 8 | 27 |
| 1 | 2 | 1 |
| 2 | 8 | 28 |
| 3 | 2 | 3 |
| 4 | 8 | 29 |
| 5 | 2 | 5 |
| 6 | 8 | 6 |
| 7 | 2 | 7 |
| 8 | 8 | 30 |
| 9 | 2 | 9 |
| 10 | 8 | 31 |
| 11 | 4 | 10 |
| 12 | 8 | 32 |
| 13 | 4 | 12 |
| 14 | 8 | 33 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | RESERVED |
| 30 | 4 | |
| 31 | 6 | |

NON-LINEARLY REPLACED

FIG.42

USER TERMINAL, RADIO BASE STATION AND ADAPTIVE MODULATION AND CODING METHOD

CROSS-REFERENCE TO RELATED APPLICATIONS

The present application is a continuation application and, thereby, claims benefit under 35 U.S.C. § 120 to U.S. patent application Ser. No. 14/763,611 filed on Jul. 27, 2015, titled, "USER TERMINAL, RADIO BASE STATION AND ADAPTIVE MODULATION AND CODING METHOD," which is a national stage application of PCT Application No. PCT/JP2014/050953, filed on Jan. 20, 2014, which claims priority to Japanese Patent Application Nos. 2013-185184 filed on Sep. 6, 2013 and 2013-014597 filed on Jan. 29, 2013. The contents of the priority applications are incorporated by reference in their entirety.

TECHNICAL FIELD

The present invention relates to a user terminal, a radio base station and an adaptive modulation and coding method in a radio communication system where adaptive modulation and coding (AMC) is employed.

BACKGROUND ART

Adaptive modulation and coding (AMC), which adjusts at least one of the modulation scheme and the coding rate on an adaptive basis, is known as link adaptation in radio communication systems.

For example, in adaptive modulation and coding in long-term evolution (LTE), at least one of the modulation scheme and the coding rate of a downlink shared channel (PDSCH: Physical Downlink Shared Channel) is adaptively controlled based on channel quality indicators that are fed back from user terminals (see, for example, non-patent literature 1).

To be more specific, in adaptive modulation and coding in LTE, user terminals feed back channel quality indicators that correspond to the channel quality (for example, the SNR, the SINR, etc.) of signals from a radio base station, to the radio base station. The radio base station transmits the PDSCH by applying modulation schemes (for example, QPSK (Quadrature Phase Shift Keying), 16 QAM (Quadrature Amplitude Modulation), 64 QAM and so on) and coding rates that match these channel quality indicators fed back.

CITATION LIST

Non-Patent Literature

Non-Patent Literature 1: 3GPP TS36.213 "Physical Layer Procedures"

SUMMARY OF INVENTION

Technical Problem

In future radio communication systems referred to as "LTE-Advanced" and so on, user terminals may become capable of receiving signals from radio base stations with even higher channel quality. Consequently, adaptive modulation and coding in future radio communication systems is expected to improve spectral efficiency by supporting high-order modulation schemes including, for example, 256 QAM (Quadrature Amplitude Modulation).

The present invention has been made in view of the above, and it is therefore an object of the present invention to provide a user terminal, a radio base station and an adaptive modulation and coding method that are suitable for adaptive modulation and coding that supports high-order modulation schemes.

Solution to Problem

The adaptive modulation and coding method according to the present invention is a user terminal that receives a downlink shared channel from a radio base station, and this radio base station has a measurement section that measures channel quality based on a reference signal from the radio base station, an acquisition section that acquires a channel quality indicator to indicate a modulation scheme and a coding rate that are applicable to the downlink shared channel in the channel quality, from a table, in which channel quality indicators, modulation schemes and coding rates are associated with each other, and a transmitting section that transmits the channel quality indicator to the radio base station, and the modulation schemes include a modulation scheme of a higher order than 64 QAM.

Advantageous Effects of Invention

According to the present invention, it is possible to provide a user terminal, a radio base station and an adaptive modulation and coding method that are suitable for adaptive modulation and coding that supports high-order modulation schemes.

BRIEF DESCRIPTION OF DRAWINGS

FIG. 2 is a diagram to show an example of a CQI table;

FIG. 3 is a diagram to show an example of an MCS table;

FIG. 4 is a diagram to show an example of a TBS table;

FIG. 7 is a diagram to show an example of a CQI table according to aspect 1 of the present invention;

FIG. 11 is a diagram to explain an adaptive modulation and coding method according to aspect 1.2 of the present invention;

FIG. 14 is a diagram to show an example of an MCS table according to aspect 2 of the present invention;

FIG. 17 is a diagram to explain an adaptive modulation and coding method according to aspect 2.2 of the present invention;

FIG. 19 is a diagram to explain an adaptive modulation and coding method according to aspect 2.3 of the present invention;

FIG. 20 is a diagram to explain an adaptive modulation and coding method according to aspect 2.3 of the present invention;

FIG. 21 is a diagram to show an example of a TBS table according to aspect 3 of the present invention;

FIG. 22 is a diagram to show an example of a TBS table according to aspect 3 of the present invention;

FIG. 23 is a diagram to show an example of a TBS table according to aspect 3 of the present invention;

FIG. 24 is a diagram to show an example of a TBS table according to aspect 3 of the present invention;

FIG. 25 is a diagram to show an example of a TBS table according to aspect 3 of the present invention;

FIG. 26 is a diagram to show an example of a TBS table according to aspect 3 of the present invention;

FIG. 27 is a diagram to show an example of a TBS table according to aspect 3 of the present invention;

FIG. 28 is a diagram to show an example of a TBS table according to aspect 3 of the present invention;

FIG. 29 is a diagram to show an example of a TBS table according to aspect 3 of the present invention;

FIG. 30 is a diagram to show an example of a TBS table according to aspect 3 of the present invention;

FIG. 31 is a diagram to show an example of a TBS table according to aspect 3 of the present invention;

FIG. 40B is a diagram to explain an adaptive modulation and coding method according to aspect 2.4 of the present invention;

FIG. 41 is a diagram to explain an adaptive modulation and coding method according to aspect 2.5 of the present invention; and FIG. 42 is a diagram to explain the adaptive modulation and coding method according to aspect 2.5 of the present invention.

DESCRIPTION OF EMBODIMENTS

Figure 1:
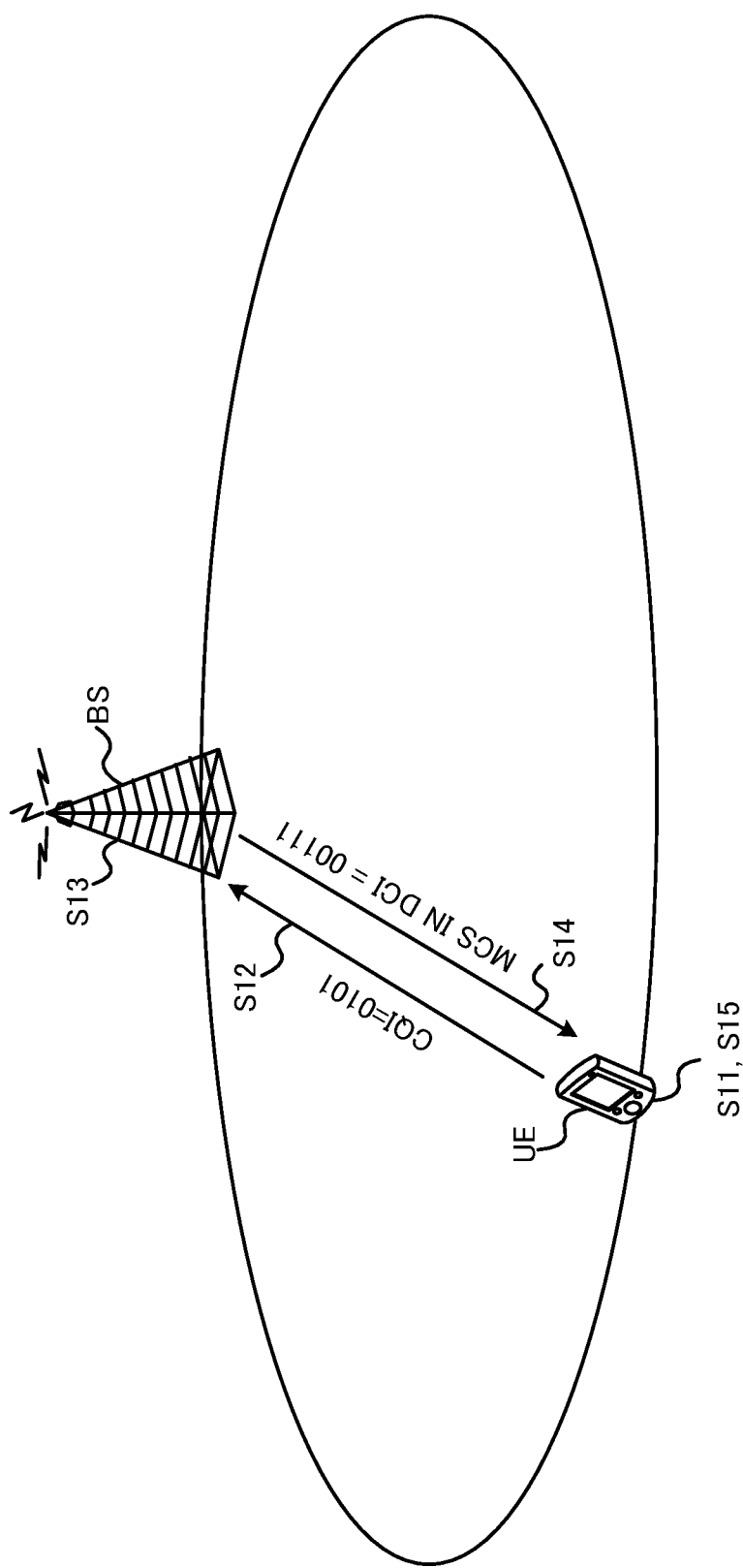
FIG. 1 is a diagram to explain adaptive modulation and coding (AMC)

Adaptive modulation and coding (AMC) in a radio communication system will be described with reference to FIG. 1 to FIG. 4. FIG. 1 is a diagram to explain AMC in a radio communication system. FIG. 2 is a diagram to show an example of a CQI table used in AMC. FIG. 3 is a diagram to show an example of an MCS table used in AMC. FIG. 4 is a diagram to show an example of a TBS table used in AMC.

In the radio communication system shown in FIG. 1, the user terminal UE measures channel quality based on a reference signal from the radio base station BS, and selects a channel quality indicator (CQI) based on the channel quality measured (step S11). To be more specific, the user terminal UE looks up the CQI table shown in FIG. 2, and selects a CQI that indicates a modulation scheme and a coding rate that are applicable to the channel quality measured. Note that the channel quality may be, for example, the SINR (Signal to Interference Plus Noise Ratio), the SNR (Signal to Noise Ratio) and so on.

As shown in FIG. 2, in the CQI table, channel quality indicators (CQIs) are associated with modulation schemes and coding rates. For example, in FIG. 2, 16 patterns of combinations of modulation schemes and coding rates are defined in association with channel quality in the user terminal UE. Consequently, in FIG. 2, these 16 patterns of combinations can be uniquely identified by providing four-bit CQIs. Note that a CQI value in the CQI table may be referred to as a "CQI index."

The user terminal UE feeds back the CQI, determined with reference to the CQI table shown in FIG. 2, to the radio base station BS (step S12). For example, in FIG. 1, four bits of bit information "0101 (=5)" is fed back from the user terminal UE to the radio base stations as the CQI. Note that the CQI is fed back by using an uplink control channel (PUCCH: Physical Uplink Control Channel), an uplink shared channel (PUSCH: Physical Uplink Shared Channel) and so on.

The radio base station BS determines modulation and coding information (MCS) for a downlink shared channel (PDSCH) based on the CQI fed back from the user terminal UE (step S13). To be more specific, the radio base station BS looks up the CQI table shown in FIG. 2 and acquires the modulation scheme and coding rate that correspond to the CQI that is fed back. Furthermore, the radio base station BS looks up the MCS table shown in FIG. 3, and acquires the MCS that indicates the modulation order to correspond to the acquired modulation scheme, and the transport block size (TBS) index to correspond to the acquired coding rate.

As shown in FIG. 3, in the MCS table, modulation and coding information (MCS), modulation orders and TBS indices are associated with each other. In FIG. 3, 32 patterns of combinations of modulation orders and TBS indices are defined. Consequently, in FIG. 3, these 32 patterns of combinations can be uniquely identified by providing five-bit MCSs. Note that an MCS value in the MCS table may be referred to as an "MCS index." Also, a TBS index refers to a transport block size (TBS) indicator to identify the transport block size (TBS).

For example, when, as shown in FIG. 1, the user terminal UE feeds back four-bit bit information "0101 (=5)" as a CQI, the radio base station BS looks up the CQI table shown in FIG. 2 and acquires "QPSK" as the modulation scheme and acquires "449" as the coding rate. Also, the radio base station BS looks up the MCS table shown in FIG. 3, and acquires the MCS "7," which is the combination of the modulation order "2" corresponding to "QPSK" and the TBS index "7" corresponding to the coding rate "449."

The radio base station BS reports the determined MCS to the user terminal UE (step S14). For example, in FIG. 1, five-bit bit information "00111 (=7)" is reported from the radio base station BS to the user terminal UE as MCS. Note that the MCS is included in downlink control information (DCI), and reported by using a downlink control channel (PDCCH: Physical Downlink Control Channel), an enhanced downlink control channel (EPDCCH: Enhanced Physical Downlink Control Channel) and so on.

The user terminal UE acquires the modulation scheme and coding rate for the PDSCH based on the MCS reported from the radio base station BS (step S15). To be more specific, the user terminal UE looks up the MCS table shown in FIG. 3, and acquires the modulation order and TBS index to correspond to the MCS that is fed back. The user terminal UE demodulates the PDSCH by using the modulation scheme corresponding to the acquired modulation order.

Also, the user terminal UE looks up the TBS table shown in FIG. 4, and acquires the transport block size (TBS) that corresponds to the acquired TBS index and the number of physical resource blocks (PRBs) per transport t block included in the DCI. The user terminal UE calculates the coding rate by, for example, equation 1, based on the acquired TBS. The user terminal UE decodes the PDSCH by using the calculated coding rate.

[1]

$$\frac{TBS + CRC\,(24\ bits)}{RE_{PDSCH} * \text{N\_PRB} * M} \approx \text{target coding rate} \quad \text{(Equation 1)}$$

Here, TBS is the transport block size, which is acquired from the TBS table shown in FIG. 4. Also, $RE_{PDSCH}$ is the number of PDSCH resource elements (REs) in one PRB pair. Also, N_PRB is the number of PRBs (or PRB pairs) per transport block. Furthermore, M is the modulation order, which is acquired from the MCS table shown in FIG. 3.

For example, when, as shown in FIG. 1, five-bit bit information "00111 (=7)" is reported from the radio base station BS as MCS, the user terminal UE looks up the MCS table shown in FIG. 3, and acquires the modulation order "2" and the TBS index "7" that correspond to the MCS "7." The user terminal UE demodulates the PDSCH by using the modulation scheme "QPSK," in which the modulation order is "2."

Also, the user terminal UE looks up the MCS table shown in FIG. 4, and acquires the TBS "712," which corresponds to the TBS index "7" and the number of PRBs per transport block (here, "6") included in the DCI. The user terminal UE calculates the coding rate by above equation 1 based on the acquired TBS, and decodes the PDSCH by using the calculated coding rate.

As described above, in AMC in a radio communication system, the modulation scheme and coding rate of the PDSCH are controlled adaptively by using CQI and MCS. By this means, the spectral efficiency improves.

Figure 5A:
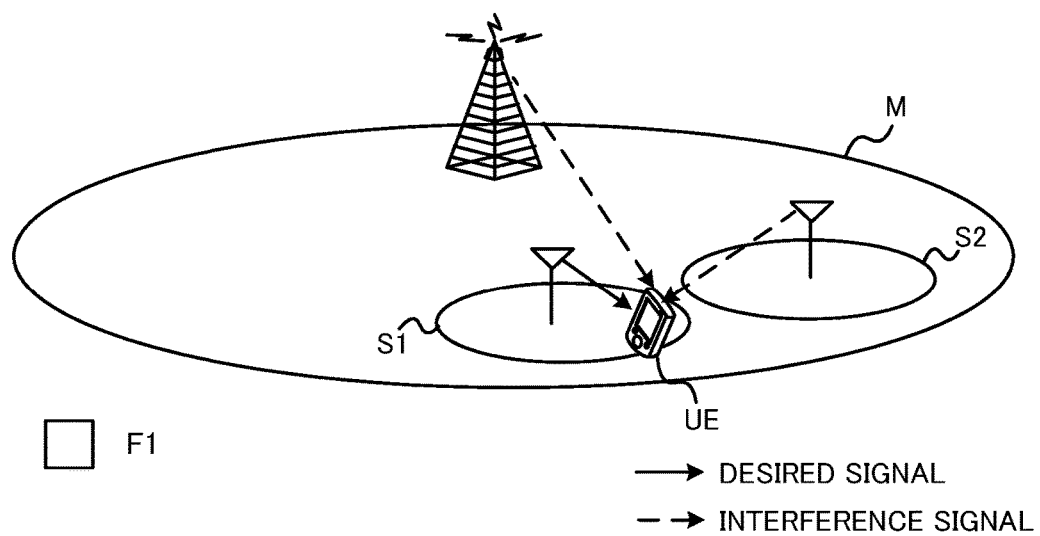
FIGS. 5A and 5B provide diagrams to explain HetNets.
Figure 5B:
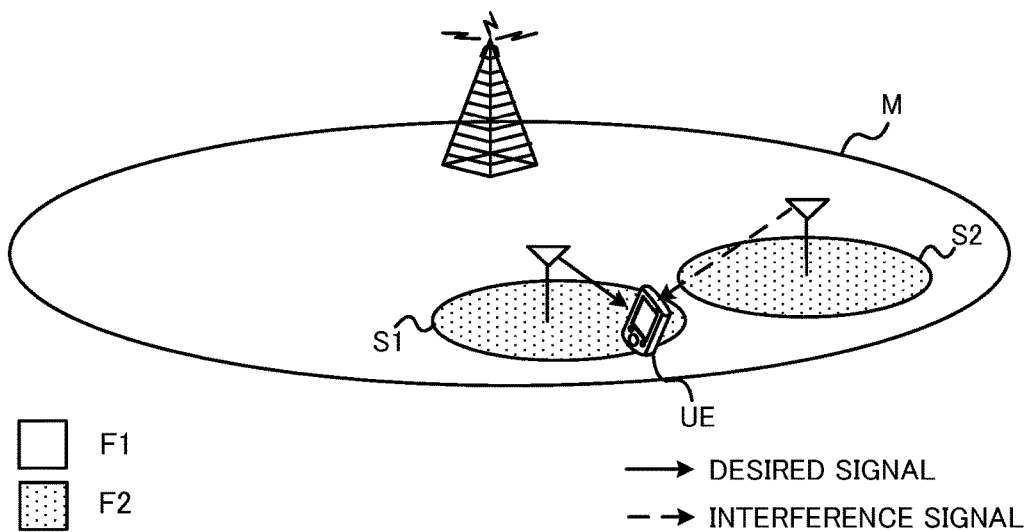

Now, there is an ongoing study to apply the above AMC to a radio communication system (also referred to as a "HetNet (Heterogeneous Network)") in which small cells are placed in a macro cell. FIG. 5 provides diagrams to show an example of a configuration of the radio communication system where small cells are placed in a macro cell. In the structure of FIG. 5A, the same frequency F1 is used between both of the macro cell M and the small cells S1 and S2. Meanwhile, in the structure of FIG. 5B, frequency F1 is used in the macro cell M, and a frequency F2 (for example, F2>F1) is used in the small cells S1 and S2.

In the configuration of FIG. 5A, the user terminal UE, being connected to the small cell S1, is interfered with by both the macro cell M and the small cell S2. Meanwhile, in the configuration of FIG. 5B, the user terminal UE, being connected to the small cell S1, is interfered with by the small cell S2, but is not interfered with by the macro cell M. Consequently, in the configuration of FIG. 5B, the channel quality in the user terminal UE may be higher than in the case illustrated with the structure of FIG. 5A.

Figures 6A, 6B:
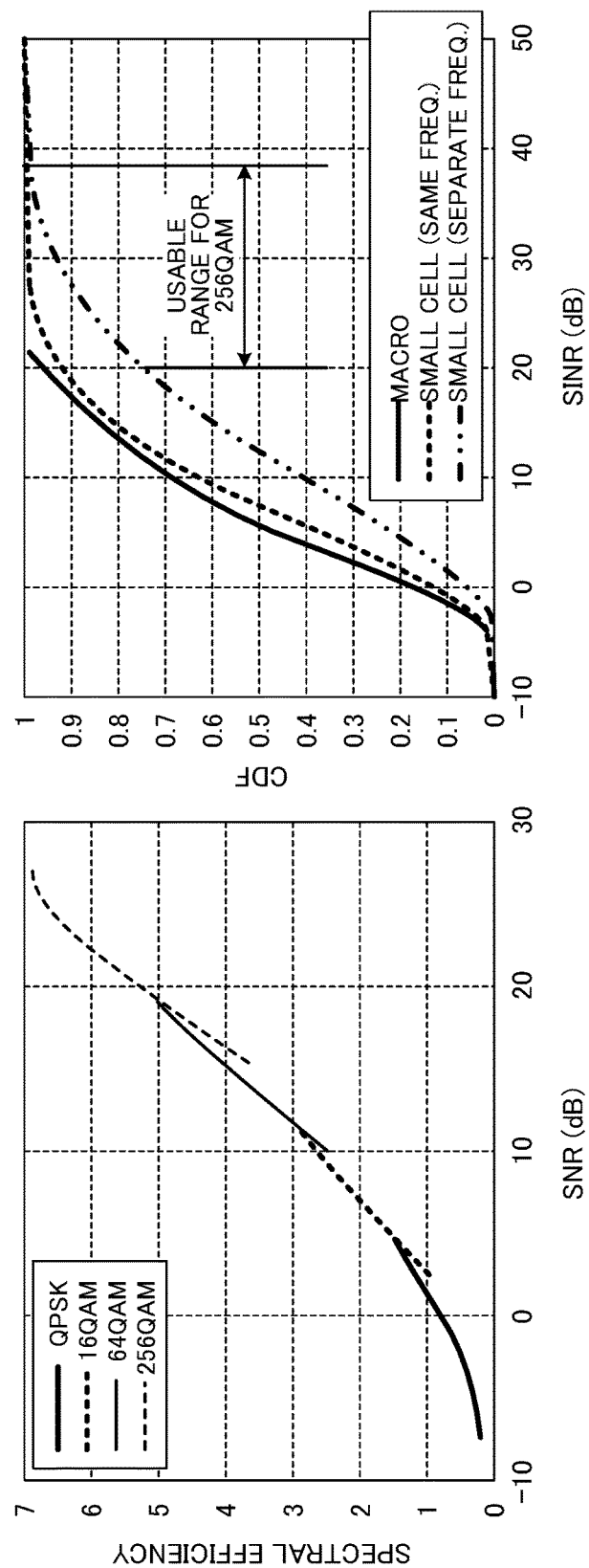
FIGS. 6A and 6B provide diagrams to explain channel quality and spectral efficiency/cumulative density function (CDF)

As the channel quality (for example, the SNR) in the user terminal UE increases, modulation schemes of higher orders become applicable, as shown in FIG. 6A. It then follows that the spectral efficiency improves as the channel quality in the user terminal UE increases. In particular, when 256 QAM is supported, further improvement of spectral efficiency is anticipated.

Also, as shown in FIG. 6B, in small cells S (FIG. 5B) to use a different frequency from that of the macro cell M, the number of user terminals UE (that is, user terminals UE where the channel quality exceeds 20 dB) that can employ 256 QAM increases, compared to the macro cell M or small cells S (FIG. 5A) to use the same frequency as that of the macro cell M. For example, referring to FIG. 6B, in small cells S to use the same frequency as in the macro cell M, 256 QAM can be applied only to approximately 10% of the user terminals UE. On the other hand, in small cells S to use a different frequency from that of the macro cell M, it is anticipated that 256 QAM can be applied to approximately 30% of the user terminals UE.

Consequently, a radio communication system in which the macro cell M and the small cells S use different frequencies is expected to support high-order modulation schemes such as 256 QAM. However, in the adaptive modulation and coding (AMC) that has been described above with reference to FIG. 1 to FIG. 4, only QPSK, 16 QAM and 64 QAM are supported.

So, the present inventors have come up with the idea of improving spectral efficiency even more by making possible adaptive modulation and coding (AMC) that supports modulation schemes higher orders than 64 QAM.

Now, adaptive modulation and coding methods according to the present invention will be described below in detail. Although examples will be described below in which 256 QAM is supported as a modulation scheme of a higher order than 64 QAM, this is by no means limiting. 128 QAM, 512 QAM, 1028 QAM and others may as well be supported as modulation schemes of higher orders than 64 QAM. Also, the adaptive modulation and coding methods of following examples 1 to 3 can be combined as appropriate.

(Aspect 1)

With the adaptive modulation and coding method according to aspect 1, a user terminal UE measures channel quality based on reference signals from a radio base station BS. Also, from a CQI table, in which channel quality indicators (CQIs), modulation schemes and coding rates are associated with each other, the user terminal UE acquires the CQI that indicates the modulation scheme and the coding rate that are applicable to the downlink shared channel (PDSCH) in the measured channel quality. Also, the user terminal UE transmits the acquired CQI to the radio base station BS. Here, the modulation schemes in the CQI table include modulation schemes of higher orders than 64 QAM.

To be more specific, with the adaptive modulation and coding method according to example 1, as shown in FIG. 7, a CQI table to associate CQIs, modulation schemes, and coding rates with each other is used. In the CQI table shown in FIG. 7, 256 QAM is supported as a modulation scheme of a higher order than 64 QAM. Note that the CQI table shown in FIG. 7 is only an example, and this is by no means limiting. Also, as noted earlier, the CQI values in the CQI table may be referred to as CQI indices.

As shown in FIG. 7, in a CQI table supporting 256 QAM, the combinations of modulation schemes and coding rates are likely to increase compared to a CQI table not supporting 256 QAM (FIG. 2). For example, although there are 16 patterns of combinations of modulation schemes and coding rates in the CQI table shown in FIG. 2, these increase to 20 patterns in the CQI table shown in FIG. 7. Consequently, it is not possible to uniquely identify the combinations of modulation schemes, including 256 QAM, and coding rates, simply by providing four-bit CQIs.

In this way, when modulation schemes of higher orders than 64 QAM are supported in a CQI table, cases might occur where the radio base station BS cannot uniquely identify the modulation scheme and coding rate that are applicable to the PDSCH. So, with the adaptive modulation and coding method according to aspect 1, the number of bits to feed back from the user terminal UE to the radio base station BS is increased in accordance with the increase of the number of CQI bits in the CQI table (aspect 1.1). Alternatively, a plurality of sub-tables may be provided in accordance with the increase of the number of CQI bits in the CQI table (aspect 1.2). Furthermore, a sampled table may be provided without increasing the number of CQI bits in the CQI table (aspect 1.3).

(Aspect 1.1)

With the adaptive modulation and coding method according to aspect 1.1, the number of bits to feed back from the user terminal UE to the radio base station BS is increased in accordance with the increase of the number of CQI bits. This makes it possible to uniquely identify the modulation schemes including 256 QAM and the coding rates.

To be more specific, the user terminal UE may transmit a CQI by expanding the size of the CQI field in the uplink control channel (PUCCH) or the uplink shared channel (PUSCH). For example, referring to the case illustrated in FIG. 7, the size of the CQI field in the PUCCH or the PUSCH may be expanded from four bits to five bits.

Figure 8:
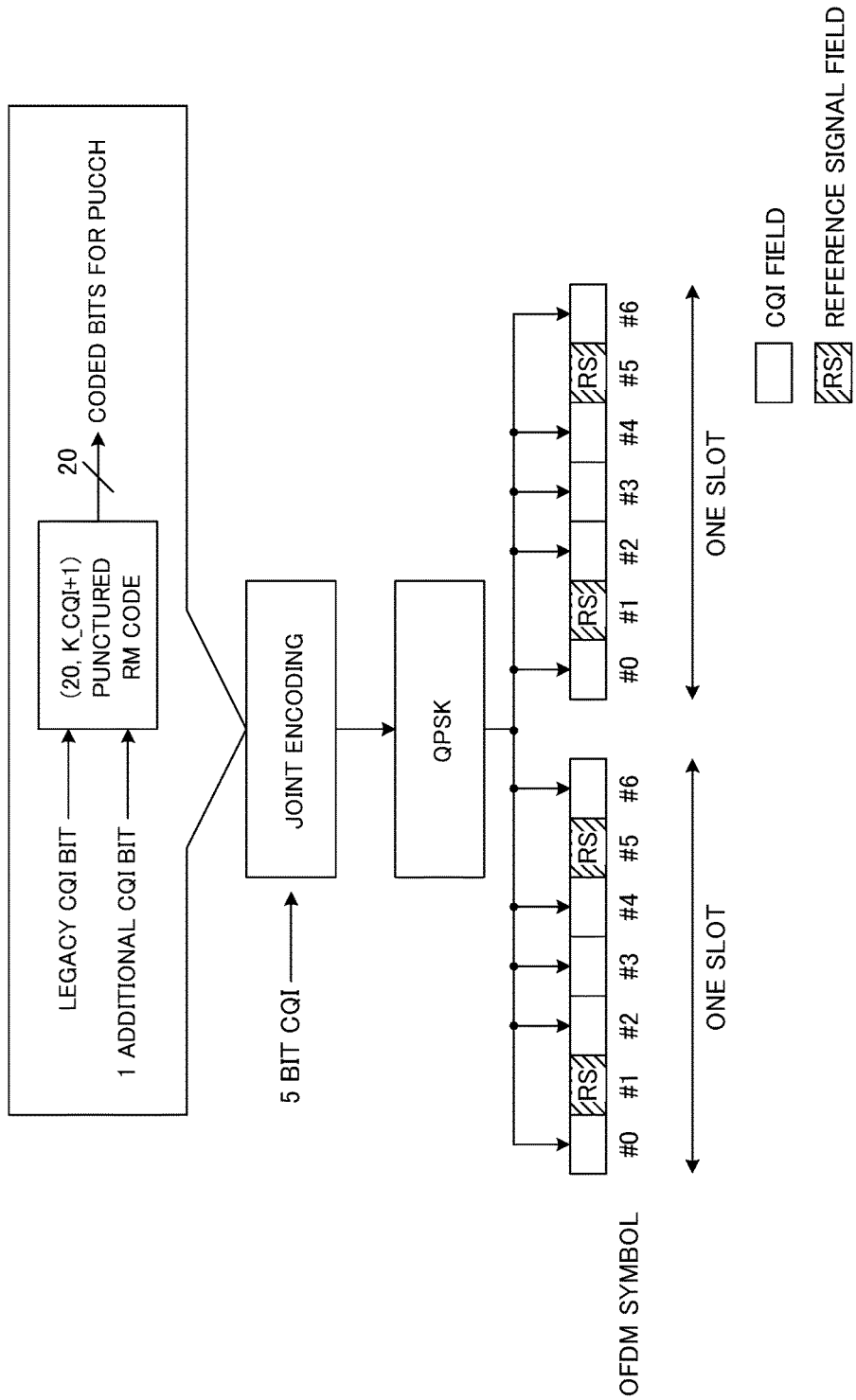
FIG. 8 is a diagram to explain an adaptive modulation and coding method according to aspect 1.1 of the present invention.

Also, the user terminal UE may transmit a CQI by carrying out joint encoding of the first bit part and the second bit part constituting the CQI. For example, referring to the case illustrated in FIG. 7, the user terminal UE carries out joint encoding of the first bit part (for example, four legacy bits) and the second bit part (for example, one additional one bit) by using RM code (Reed-Muller-based block code), as shown in FIG. 8. In this case, the user terminal UE may transmit the joint-encoded bits to the radio base station BS by using the PUCCH (for example, the extended CP of PUCCH format 2).

Figure 9:
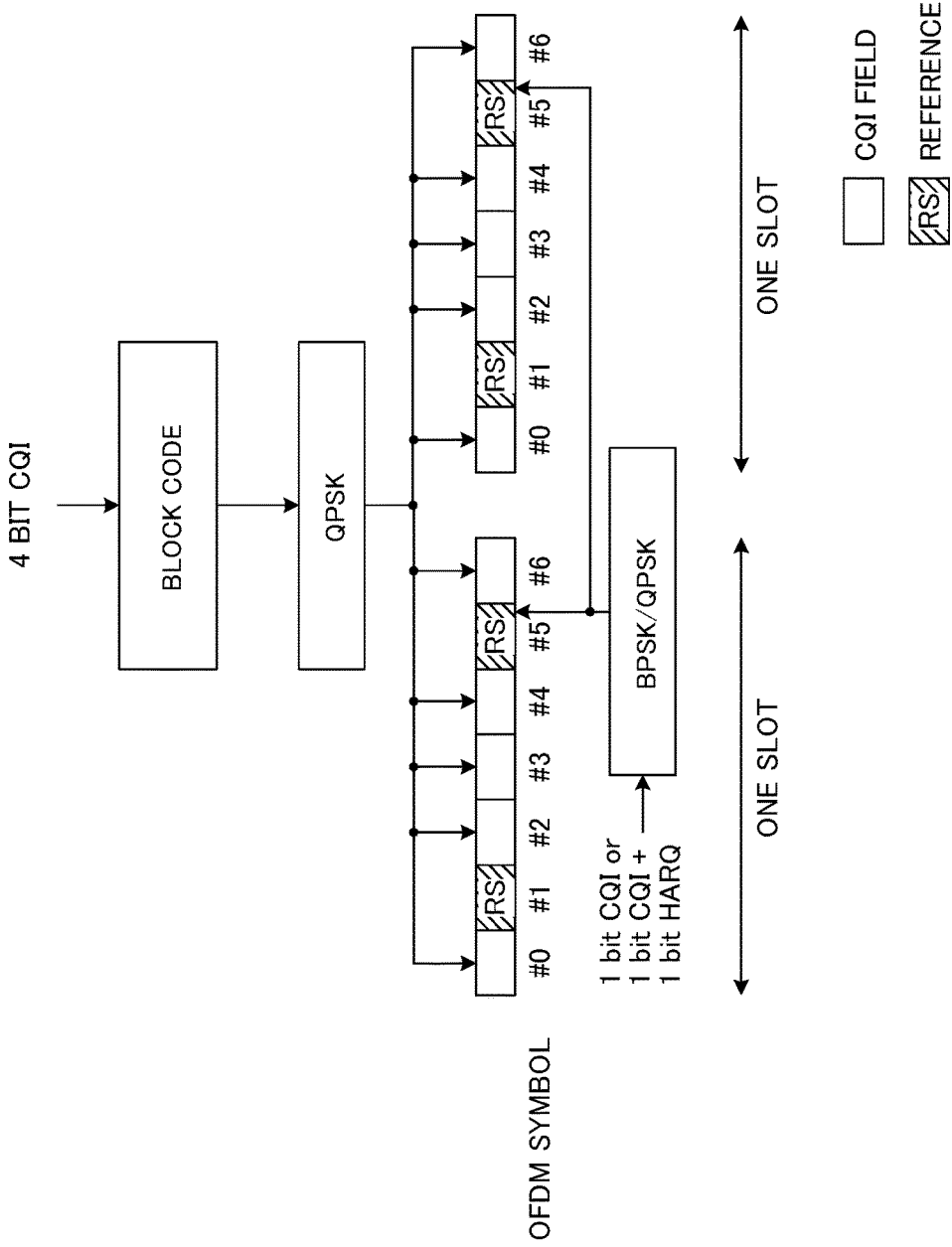
FIG. 9 is a diagram to explain an adaptive modulation and coding method according to aspect 1.1 of the present invention.

Also, the user terminal UE may transmit a CQI by using the CQI field and the reference signal field in the PUCCH. For example, referring to the case illustrated in FIG. 7, the user terminal UE transmits the first bit part (for example, four legacy bits) by using CQI fields (here, OFDM symbols #0, #2 to #4 and #6), as shown in FIG. 9. Also, the user terminal UE transmits the second bit part (for example, one additional one bit) by using a reference signal field (here, OFDM symbol #5). Furthermore, referring to FIG. 9, when PUCCH format 2a is used, in the reference signal field (here, OFDM symbol #5), instead of the HARQ bit (one bit), the second bit part (for example, one additional one bit) may be transmitted by BPSK. Alternatively, when PUCCH format 2b is used, in the reference signal field (here, OFDM symbol #5), instead of the HARQ bits (two bits), the second bit part (for example, one additional one bit) and an HARQ bit (one bit) may be transmitted by QPSK. In this case, PUCCH formats 2a/2b can be re-used, so that it is possible to reduce the processing load which the increased number of CQI bits entails.

Note that, although, in FIG. 9, the second bit part (for example, one additional one bit) of the CQI is transmitted in the second reference signal field (OFDM symbol #5) in one slot, this may be transmitted in the first reference signal field (OFDM symbol #1) in one slot as well. Furthermore, the arrangement of CQI fields and reference signal fields is by no means limited to the example shown in FIG. 9.

(Aspect 1.2)

With the adaptive modulation and coding method according to aspect 1.2, a plurality of sub-tables are provided in accordance with the increase of the number of CQI bits in the CQI table. By this means, it is possible to uniquely identify the modulation schemes, including 256 QAM, and the coding rates, without changing the number of bits to feed back from the user terminal UE to the radio base station BS.

With the adaptive modulation and coding method according to aspect 1.2, the use of sub-tables, between which the starting CQI value is shifted, may be reported explicitly (FIG. 10), or may not be reported explicitly (that is, may be reported implicitly instead) (FIG. 11), between the radio base station BS and the user terminal UE.

Figure 10:
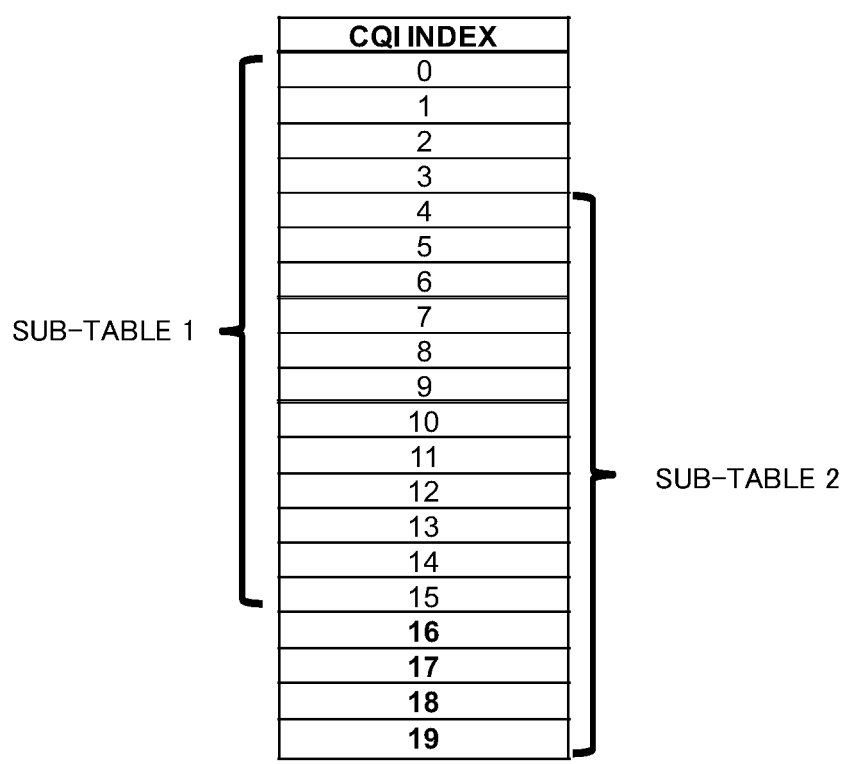
FIG. 10 is a diagram to explain an adaptive modulation and coding method according to aspect 1.2 of the present invention.

A case will be described here, with reference to FIG. 10, where the use of sub-tables is reported explicitly. In this case, as shown in FIG. 10, the CQI table may include a first sub-table (SUB-TABLE 1), which covers the CQIs from the minimum value (here, "0") to a final value (here, "15") that is smaller than the maximum value, and a second sub-table (SUB-TABLE 2), which covers the CQIs from the starting value (here, "4"), which is larger than the minimum value, to the maximum value (here, "19"). Note that, although FIG. 10 shows CQIs alone, it is equally possible to associate CQIs, modulation schemes and coding rates with each other as shown in FIG. 7. Also, the structures of the first and second sub-tables are by no means limited to the structures shown in FIG. 10.

Here, the starting value of the second sub-table may be reported from the radio base station BS to the user terminal UE, or may be reported from the user terminal UE to the radio base station BS. In this way, by reporting the starting value of the second sub-table between the radio base station BS and the user terminal UE, the use of the second sub-table is explicitly reported.

Note that the starting value of the second sub-table may be reported from the radio base station BS to the user terminal UE through higher layer signaling such as RRC signaling, or by using the PDCCH, the EPDCCH, a broadcast channel and so on. Alternatively, the starting value of the second sub-table may be reported from the user terminal UE to the radio base station BS through higher layer signaling such as RRC signaling, or by using the PUCCH and so on.

As shown in FIG. 10, when the first sub-table and the second sub-table are provided, the user terminal UE feeds back an operation result that is acquired based on the CQI corresponding to the modulation scheme and the coding rate that are applicable to the PDSCH in measured channel quality, and the starting value of the second sub-table, to the radio base station BS. Meanwhile, the radio base station BS retrieves the CQI to correspond to the modulation scheme and the coding rate that are applicable to the PDSCH, based on the feedback value from the user terminal UE, and the starting value of the second sub-table.

For example, referring to FIG. 10, assume that, when the maximum CQI value is "19" and the starting value of the second sub-table is "4," the CQI to correspond to the modulation scheme and the coding rate that are applicable to the PDSCH in measured channel quality is "18." In this case, the user terminal UE may transmit the operation result "14," produced by following equation 2, to the radio base station BS.

(the maximum CQI value−the starting value of the second sub-table+CQI)

mod the maximum CQI value

=(19−4+18)mod 19=14  (Equation 2)

On the other hand, the radio base station BS may retrieve the CQI "18" to correspond to the modulation scheme and the coding rate to be applied to the PDSCH, from following equation 3, based on the feedback value from the user terminal UE and the starting value of the second sub-table.

(the feedback value from the user terminal UE+the starting value of the second sub-table)

mod the maximum CQI value

=(14+4)mod 19=18  (Equation 3)

Note that the operation result in the user terminal UE is transmitted by using, for example, the CQI field in the PUCCH or the PUSCH. According to equation 2, in the case illustrated in FIG. 10, the operation results of the CQIs "4" to "19" included in the second sub-table are "0" to "15." Also, since the use of the second sub-table is explicitly reported between the radio base station BS and the user terminal UE, it is possible to uniquely identify the modulation schemes, including 256 QAM, and the coding rates, without expanding the legacy CQI field in the PUCCH or the PUSCH.

Next, a case will be described below, with reference to FIG. 11, where the use of sub-tables is not explicitly reported. In this case, as shown in FIG. 11, the CQI table may include a first sub-table (SUB-TABLE 1), which covers the CQIs from the minimum value (here, "0") to a final value (here, "15") that is smaller than the maximum value, and a second sub-table (SUB-TABLE 2), which covers the CQIs from the starting value (here, "4"), which is larger than the minimum value, to the maximum value (here, "19"). Note that, although CQIs and feedback values are associated with each other in FIG. 11, it is equally possible to associate CQIs, modulation schemes and coding rates with each other as shown in FIG. 7. Note that the feedback values do not have to be associated explicitly, as long as they are calculated based on CQIs. Also, the structures of the first and second sub-table are by no means limited to the structures illustrated in FIG. 11.

When the use of the second sub-table is not explicitly reported, the radio base station BS judges whether or not the second sub-table is used based on CQI history, and retrieves the CQI to correspond to the modulation scheme and the coding rate that are applied to the PDSCH based on the result of that judgment.

To be more specific, the user terminal UE feeds back an operation result that is acquired based on the CQI corresponding to the modulation scheme and the coding rate that are applicable to the PDSCH in measured channel quality, to the radio base station BS. Meanwhile, the radio base station BS judges whether or not the second sub-table is used based on CQI history, and, based on the result of this judgement and the feedback value from the user terminal UE, retrieves the CQI to correspond to the modulation scheme and the coding rate that are applied to the PDSCH.

For example, when, as shown in FIG. 11, the number of CQIs included in the first sub-table is "16," the user terminal UE may transmit the operation result produced by following equation 4 to the radio base station BS.

(CQI)mod 16  (Equation 4)

Here, when the feedback value from the user terminal UE is "1," the CQI is "1" if the first sub-table is used. On the other hand, the CQI is "17" if the second sub-table is used. So, the radio base station BS judges whether or not the second sub-table is used based on CQI history.

For example, if the previous CQI was equal to or greater than a predetermined value (for example, "15"), the radio base station BS judges that the second sub-table is used, and makes the present CQI "17." On the other hand, if the previous CQI was lower than the predetermined value (for example, "15"), the radio base station BS judges that the second sub-table is not used (the first sub-table is used), and makes the present CQI "1."

Alternatively, when the CQI that is retrieved is the maximum CQI value (for example, "15") in the first sub-table, the radio base station BS may judge that the second sub-table is used for later feedback values. On the other hand, when the CQI that is retrieved is the minimum CQI value (for example, "4") in the second sub-table, the radio base station BS may judge that the second sub-table is not used (the first sub-table is used) for later feedback values.

Note that the feedback values in the user terminal UE may be transmitted by using, for example, the CQI field in the PUCCH or the PUSCH. According to equation 4, in the case illustrated in FIG. 11, the operation results of the CQIs "1" to "19" included in the first sub-table and the second sub-table are "0" to "15." Also, the radio base station BS can judge whether or not the second sub-table is used based on CQI history. Consequently, it is possible to uniquely identify the modulation schemes, including 256 QAM, and the coding rates, without expanding the legacy CQI field in the PUCCH or the PUSCH. Also, as examples of making advanced use of a plurality of sub-tables, a method of switching between tables depending on the type of the connecting radio base station BS, and a method of switching between tables depending on the capabilities of user terminals UE may be included.

(Aspect 1.3)

With the adaptive modulation and coding method according to aspect 1.3, a sampled table is provided without increasing the number of CQI bits in the CQI table. By this means, it is possible to uniquely identify the modulation schemes, including 256 QAM, and the coding rates without changing the number of bits to feed back from the user terminal UE to the radio base station BS.

Figure 12:
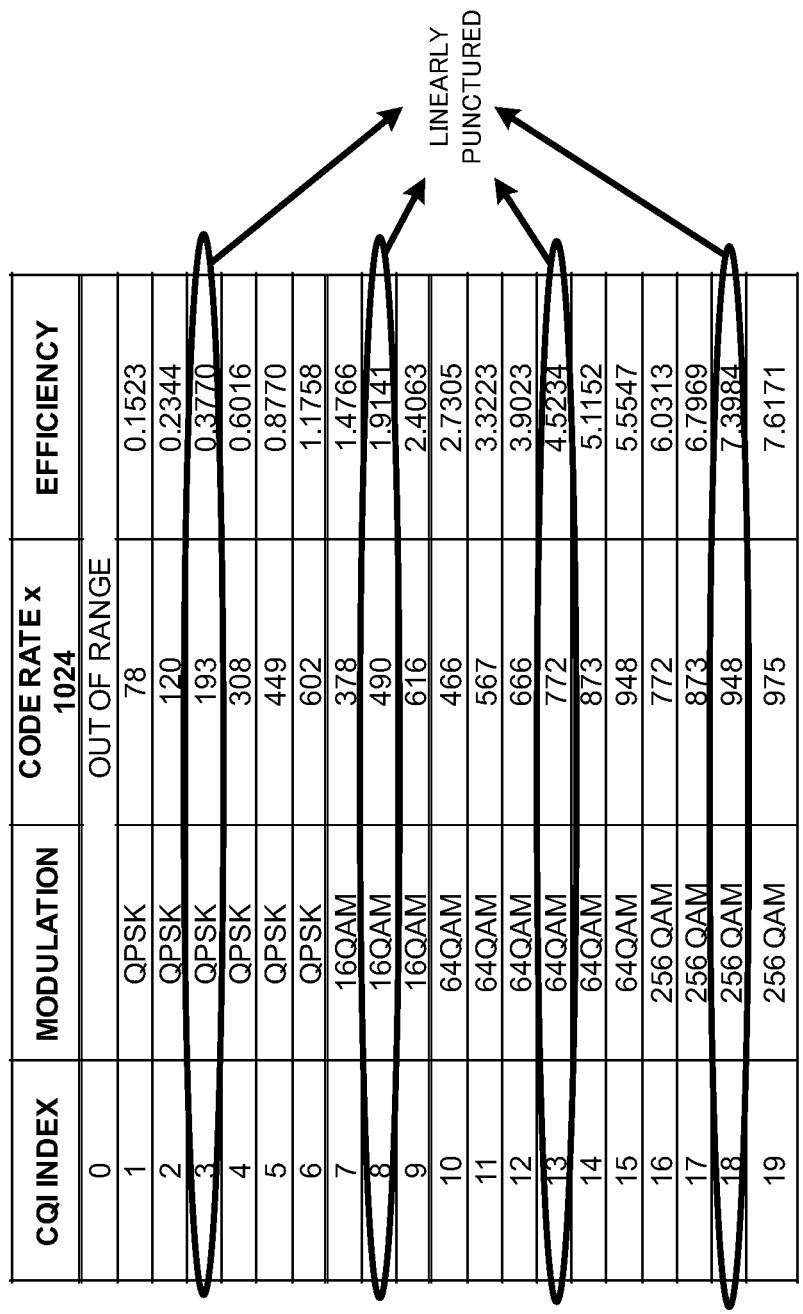
FIG. 12 is a diagram to explain an adaptive modulation and coding method according to aspect 1.3 of the present invention.

To be more specific, as shown in FIG. 12, a CQI table, in which combinations of modulation schemes and coding rates in the CQI table shown in FIG. 7 are linearly punctured, and a predetermined number of (here, 16 patterns of) combinations are sampled, may be used. For example, in FIG. 12, one coding rate is punctured from each of the modulation schemes QPSK, 16 QAM, 64 QAM and 256 QAM.

Figure 13:
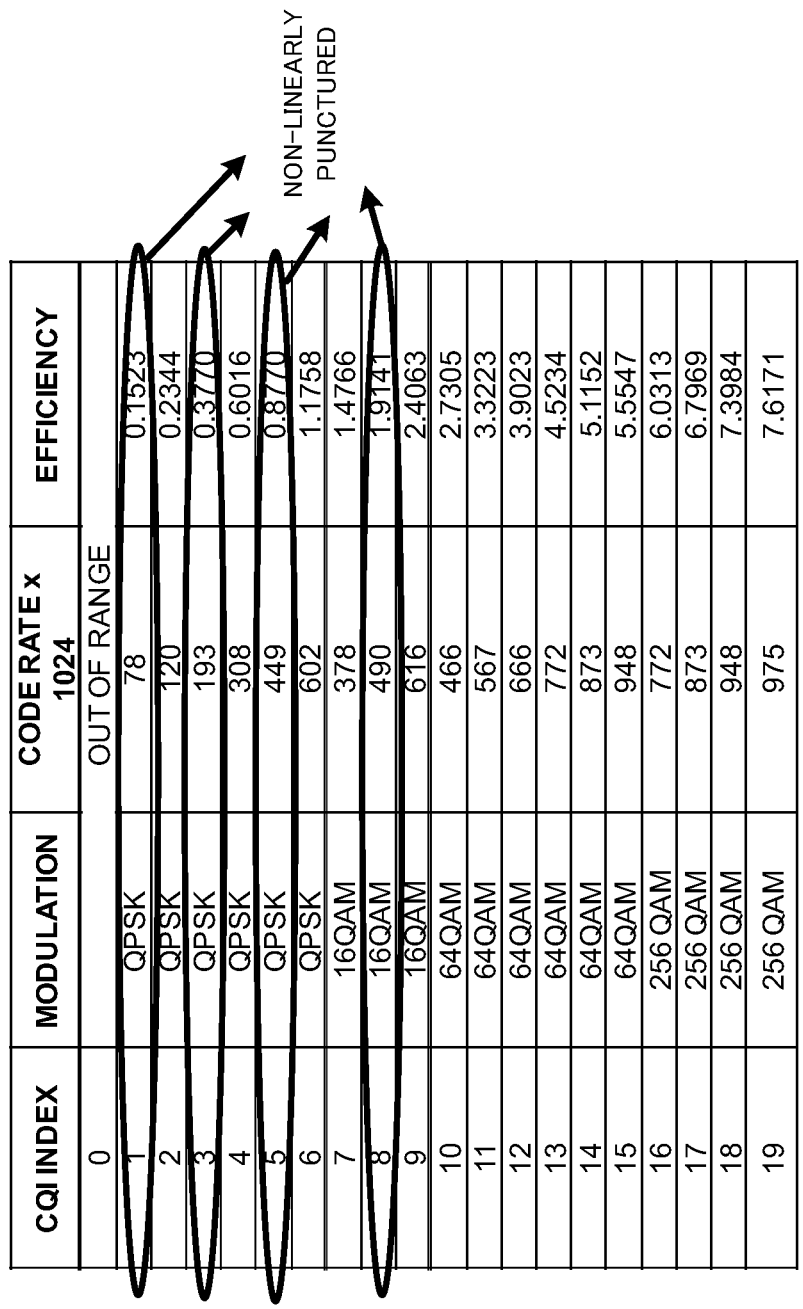
FIG. 13 is a diagram to explain an adaptive modulation and coding method according to aspect 1.3 of the present invention.

Furthermore, as shown in FIG. 13, a CQI table, in which combinations of modulation schemes and coding rates in the CQI table shown in FIG. 7 are non-linearly punctured, and a predetermined number of (here, 16 patterns of) combinations are sampled, may be used. For example, in FIG. 13, more coding rates are punctured in modulation schemes of lower orders such as QPSK and 16 QAM. In an environment where a high-order modulation scheme such as 256 QAM is employed, the likelihood that low-order modulation schemes such as QPSK and 16 QAM are employed is likely to be low. Consequently, by puncturing more combinations from the low-order modulation schemes, it is possible to further improve the spectral efficiency that is made possible by the application of the high-order modulation scheme.

With the above adaptive modulation and coding method according to aspect 1.3, a sampled table to match the number of legacy CQI bits (for example, four bits) is provided. Consequently, it is possible to uniquely identify the modulation schemes, including 256 QAM, and the coding rates without expanding the legacy CQI field in the PUCCH or the PUSCH.

(Aspect 1.4)

With the adaptive modulation and coding method according to aspect 1.4, similar to aspect 1.3, a sampled table, in which combinations of predetermined modulation schemes and coding rates are sampled, is provided without increasing the number of CQI bits in the CQI table.

To be more specific, with the adaptive modulation and coding method according to aspect 1.4, the combinations of low-order modulation schemes (for example, QPSK) and coding rates are maintained. Meanwhile, the combinations of high-order modulation schemes (for example, 16 QAM, 64 QAM, 256 QAM and so on) and coding rates are punctured, depending on the level of contribution to throughput. The level of contribution to throughput here may be shown by the increment of spectral efficiency, the usage rate of the CQI, and so on.

Figures 37A, 37B:
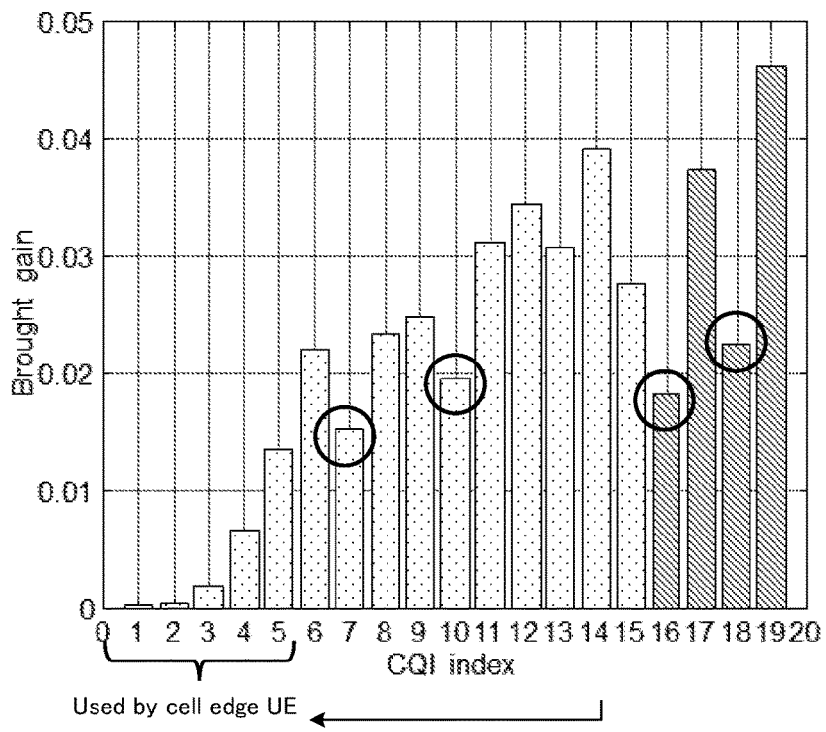
FIGS. 37A and 37B provide diagrams to explain an adaptive modulation and coding method according to aspect 1.4 of the present invention.

For example, with the CQI table shown in FIG. 37B, the combinations of QPSK with coding rates are not punctured but maintained. User terminals UE on cell edges may use the combinations of low-order QPSK and coding rates. Consequently, by maintaining the combinations of QPSK and coding rates, it is possible to prevent the user terminals UE on cell edges from being incapable of reception with desired received quality.

Meanwhile, in the CQI table shown in FIG. 37B, combinations to show lower levels of contribution to throughput are selected from among the combinations of the modulation schemes of higher orders than 16 QAM and coding rates, and punctured. In FIG. 37A, the modulation schemes of higher orders than 16 QAM show relatively low gain (which is the level of contribution to throughput) in CQI=7, 10, 16 and 18. Consequently, in the CQI table shown in FIG. 37B, the combinations of modulation schemes and coding rates corresponding to CQI=7, 10, 16 and 18 are punctured. Note that FIG. 37B is simply an example, and different puncturing from that of FIG. 37B may be carried out as well.

With the above adaptive modulation and coding method according to aspect 1.4, while the combinations of low-order modulation schemes and coding rates are maintained, combinations to show lower levels of contribution to throughput among the combinations of high-order modulation schemes and coding rates are punctured. Consequently, it is possible to secure desired received quality in cell-edge user terminals UE, while preventing the number of CQI bits in the CQI table from increasing.

(Aspect 1.5)

With the adaptive modulation and coding method according to aspect 1.5, instead of puncturing combinations of predetermined modulation schemes and coding rates (see examples 1.3 and 1.4), (combinations of predetermined modulation schemes and coding rates are replaced with combinations of modulation schemes of higher orders than 64 QAM (for example, 256 QAM) and coding rates. In this way, by replacing combinations of conventional modulation schemes and coding rates, it is possible to support combinations of 256 QAM and coding rates, without increasing the number of CQI bits in the CQI table.

Figure 38:
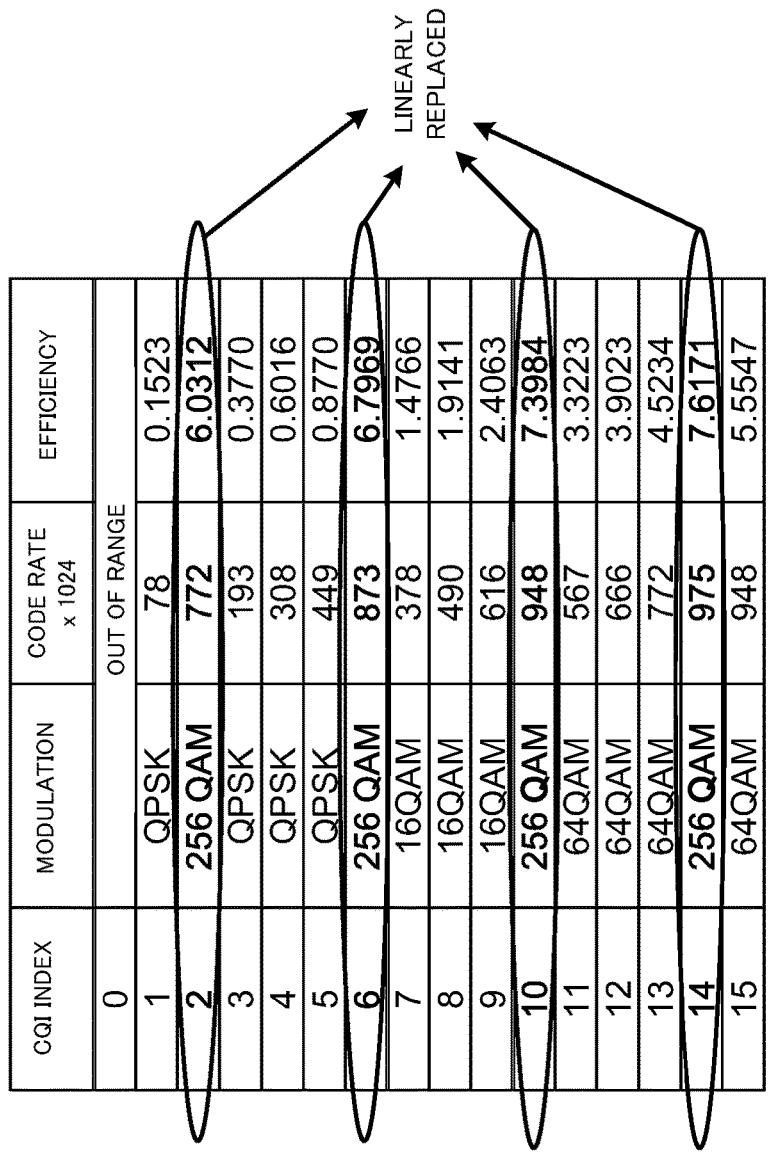
FIG. 38 is a diagram to explain an adaptive modulation and coding method according to aspect 1.5 of the present invention.

To be more specific, as shown in FIG. 38, a CQI table, in which combinations of predetermined modulation schemes and coding rates in the CQI table shown in FIG. 2 are linearly replaced with combinations of 256 QAM and coding rates, may be used. Note that FIG. 38 is simply an example, and different replacement from that of FIG. 38 may be carried out as well.

Figure 39:
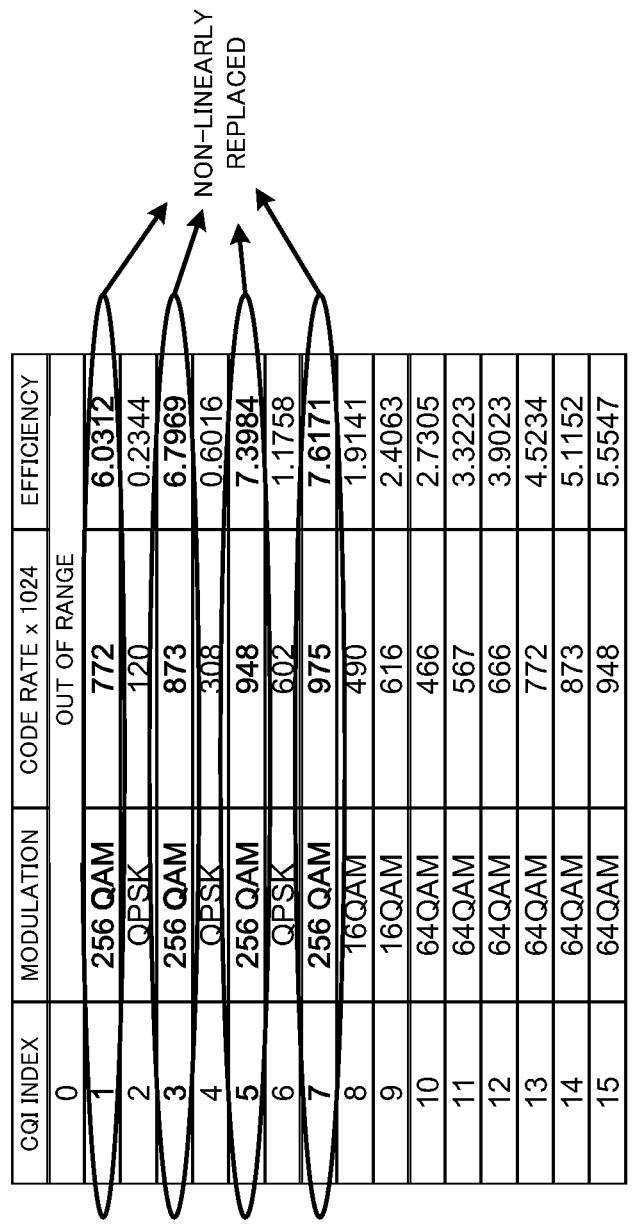
FIG. 39 is a diagram to explain an adaptive modulation and coding method according to aspect 1.5 of the present invention.

Furthermore, as shown in FIG. 39, a CQI table, in which combinations of predetermined modulation schemes and coding rates in the CQI table shown in FIG. 2 are non-linearly replaced with combinations of 256 QAM and coding rates, may be used as well. For example, in FIG. 39, combinations of low-order modulation schemes such as QPSK and 16 QAM and coding rates are replaced with combinations of 256 QAM and coding rates. Note that the combinations of modulation schemes and coding rates to be replaced may be selected based on received quality (for example, the SINR and/or the like). Also, FIG. 39 is simply an example, and different replacement from that of FIG. 39 may be carried out as well.

In an environment (for example, a small cell) where a high-order modulation scheme such as 256 QAM is employed, the likelihood that low-order modulation schemes such as QPSK are employed is likely to be low. Consequently, by replacing more combinations from the low-order modulation schemes, it is possible to further improve the spectral efficiency that is made possible by the application of the high-order modulation scheme.

With the above adaptive modulation and coding method according to aspect 1.5, it is possible to maintain the number of legacy CQI bits (for example, four bits). Consequently, it is possible to uniquely identify the modulation schemes, including 256 QAM, and the coding rates without expanding the legacy CQI field in the PUCCH or the PUSCH.

(Aspect 2)

With the adaptive modulation and coding method according to aspect 2, the radio base station BS receives a channel quality indicator (CQI) that indicates the modulation scheme and the coding rate that are applicable to the downlink shared channel (PDSCH), from a user terminal UE. Also, from an MCS table in which modulation and coding information (MCSs), modulation orders and TBS indices (transport block size indicators) are associated with each other, the radio base station BS acquires the MCS to show the modulation order and the TBS index to correspond to the modulation scheme and the coding rate. Also, the radio base station BS transmits the acquired MCS to the user terminal UE. Here, the modulation orders in the MCS table include the modulation orders of modulation schemes of higher orders than 64 QAM.

To be more specific, with the adaptive modulation and coding method according to aspect 2, as shown in FIG. 14, an MCS table to associate modulation and coding information (MCSs), modulation orders and TBS indices with each other is used. In the MCS table shown in FIG. 14, the modulation order "8" of 256 QAM is supported as a modulation scheme of a higher order than 64 QAM.

Note that the MCS table shown in FIG. 14 is simply an example and this is by no means limiting. For example, the comments on spectral efficiency and the coding rates in the MCS table shown in FIG. 14 may be removed. Also, the MCS values in the MCS table may be referred to as MCS indices.

As shown in FIG. 14, in an MCS table supporting 256 QAM, the combinations of modulation orders and TBS indices are likely to increase compared to an MCS table not supporting 256 QAM (FIG. 3). For example, although there are 32 patterns of combinations of modulation orders and TBS indices in the MCS table shown in FIG. 3, these increase to 40 patterns in the MCS table shown in FIG. 14. Consequently, it is not possible to uniquely identify the combinations of the modulation orders of modulation schemes, including 256 QAM, and TBS indices, simply by providing five-bit MCSs.

In this way, when supporting the modulation orders of modulation schemes of higher orders than 64 QAM in an MCS table, cases might occur where the user terminal UE cannot uniquely identify the modulation scheme and coding rate that are applied to the PDSCH. So, with the adaptive modulation and coding method according to aspect 2, the number of bits to report from the radio base station BS to the user terminal UE is increased in accordance with the increase of the number of MCS bits in the MCS table (aspect 2.1). Alternatively, a plurality of sub-tables may be provided in accordance with the increase of the number of MCS bits in the MCS table (aspect 2.2). Furthermore, a sampled table may be provided without increasing the number of MCS bits in the MCS table (aspect 2.3).

(Aspect 2.1)

With the adaptive modulation and coding method according to aspect 2.1, the number of bits to report from the radio base station BS to the user terminal UE is increased in accordance with the increase of the number of MCS bits. This allows the user terminal UE to uniquely identify the modulation schemes including 256 QAM and the coding rates.

To be more specific, the radio base station BS may transmit an MCS by expanding the size of the MCS field in downlink control information (DCI). For example, referring to the case illustrated in FIG. 14, the size of the MCS field in DCI may be expanded from five bits to six bits. Note that the DCI to include the MCS field is transmitted by a downlink control channel (PDCCH).

Figure 15:
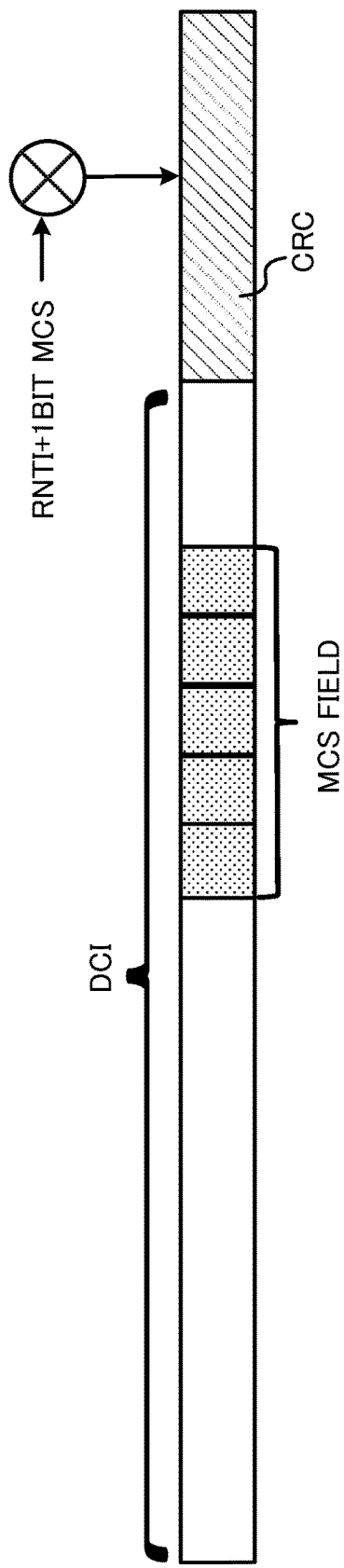
FIG. 15 is a diagram to explain an adaptive modulation and coding method according to aspect 2.1 of the present invention.

Also, the radio base station BS may transmit an MCS by using the MCS field in the DCI and the masking of the CRC (Cyclic Redundancy Check) that is attached to the DCI. For example, in the case illustrated in FIG. 14, the radio base station BS transmits the first bit part (for example, five legacy bits) constituting the MCS by using the MCS field in the DCI, as shown in FIG. 15. Also, the radio base station BS masks the CRC attached to the DCI with a sequence that represents the second bit part (for example, one additional one bit) constituting the MCS, and transmits this.

For example, in FIG. 15, the CRC sequence $C_k$ attached to the DCI is generated by, for example, equation 5, based on the initial sequence $C_{initial\_k}$, the RNTI (Radio Network Temporary Identifier) sequence $R_k$ that is assigned to the user terminal UE, and the sequence $H_k$ to represent the second bit part (for example, one additional one bit) of the MCS.

$$C_k = (C_{initial\_k} + R_k + H_k) \bmod 2 \ (k=0, \ldots, 15) \qquad \text{(Equation 5)}$$

Figure 16:
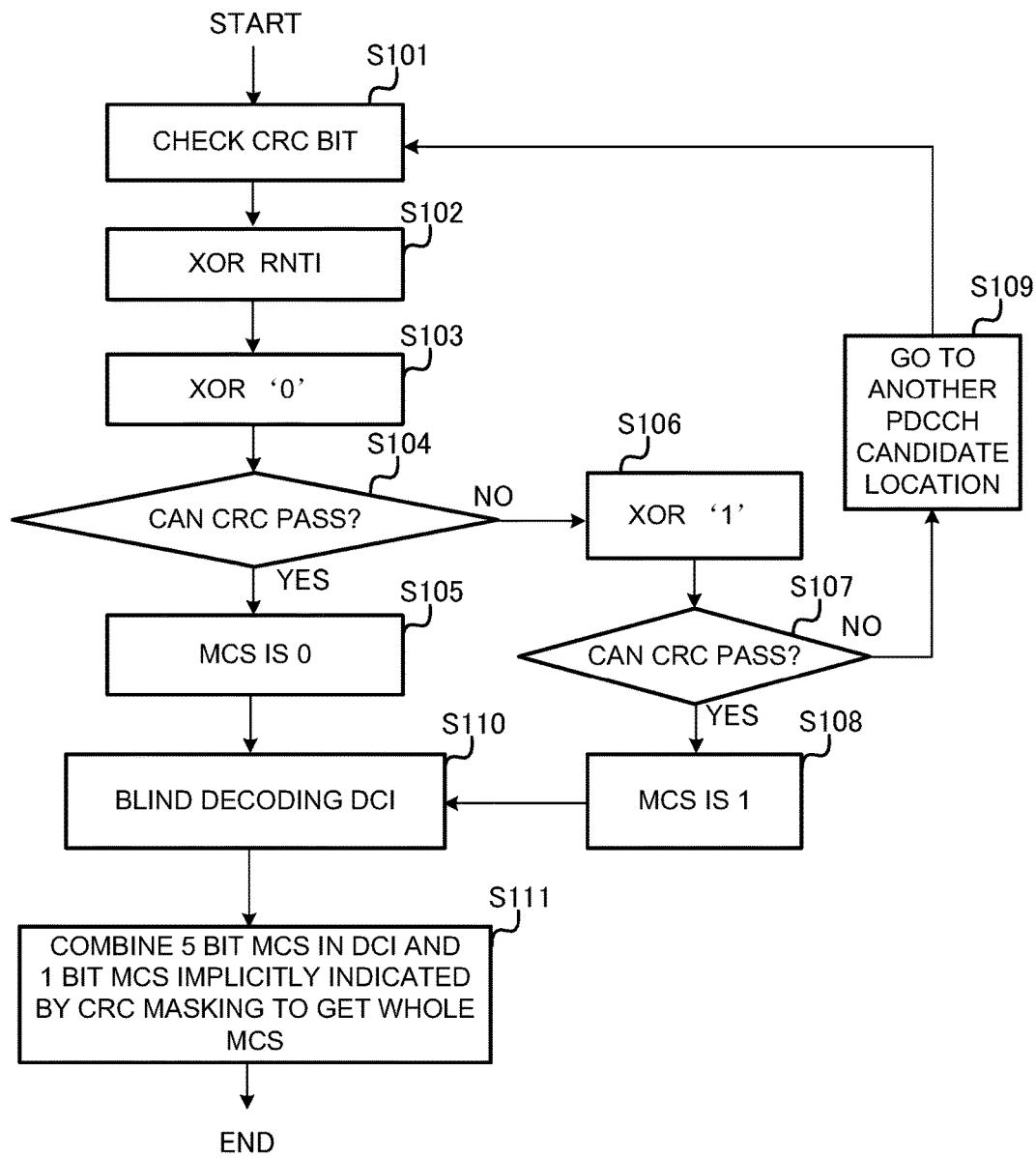
FIG. 16 is a diagram to explain an adaptive modulation and coding method according to aspect 2.1 of the present invention.

Meanwhile, the user terminal UE retrieves the MCS by following, for example, the flow shown in FIG. 16. As shown in FIG. 16, the user terminal UE checks (samples) the CRC sequence attached to the DCI (step S101). The user terminal UE calculates the exclusive disjunction (XOR) of the CRC sequence and the RNTI sequence assigned to the subject terminal (step S102), and calculates the exclusive disjunction (XOR) of the operation result of step S102 and "0" (step S103). The user terminal UE judges whether or not the CRC can pass, based on the operation result of step S103 (step S104).

When the CRC passes according to the operation result of step S103 (step S104: Yes), the user terminal UE judges that the value of the second bit part (for example, one additional one bit) of the MCS is "0" (step S105). On the other hand, when the CRC does not pass (step S104: No), the user terminal UE calculates the exclusive disjunction (XOR) of the operation result of step S103 and "1" (step S106), and judges whether or not CRC can pass, based on this operation result (step S107).

When the CRC passes according to the operation result of step S106 (step S107: Yes), the user terminal UE judges that the value of the second bit part of the MCS (for example, one additional one bit) is "1" (step S108). On the other hand, when the CRC does not pass (step S107: No), the user terminal UE judges that the masking by the second bit part of the MCS is not applied (step S109). This operation then returns to step S101, and moves on to the CRC sequence check in the next candidate PDCCH location.

The user terminal UE blind-decodes the DCI (step S110). The user terminal UE couples the value of the first bit part (for example, four legacy bits) contained in the MCS field in the DCI, and the value of the second bit part (for example, one legacy bit) judged in step S105 or in step S108, and acquires the MCS (step S111).

(Aspect 2.2)

With the adaptive modulation and coding method according to aspect 2.2, a plurality of sub-tables are provided in accordance with the increase of the number of MCS bits in the MCS table. By this means, it is possible to uniquely identify the modulation schemes, including 256 QAM, and the coding rates without changing the number of bits to report from the radio base station BS to the user terminal UE.

With the adaptive modulation and coding method according to aspect 2.2, the use of sub-tables, between which the starting MCS value is shifted, may be reported explicitly (FIG. 17), or may not be reported explicitly (that is, reported implicitly instead) (FIG. 18), between the radio base station BS and the user terminal UE.

Now, a case will be described, with reference to FIG. 11, where the use of sub-tables is explicitly reported. In this case, as shown in FIG. 17, the MCS table may include a first sub-table (SUB-TABLE 1), which covers the MCSs from the minimum value (here, "0") to a final value (here, "31") that is smaller than the maximum value, and a second sub-table (SUB-TABLE 2), which covers the MCSs from the starting value (here, "8"), which is larger than the minimum value, to the maximum value (here, "39"). Note that, although FIG. 17 shows MCSs alone, it is equally possible associate MCSs, modulation orders, TBS indices and so on with each other, as shown in FIG. 14.

Here, the starting value of the second sub-table is reported from the radio base station BS to the user terminal UE. For example, the radio base station BS may report the starting value of the second sub-table through higher layer signaling such as RRC signaling, or by using the PDCCH, the EPDCCH, a broadcast channel and so on. In this way, the radio base station BS reports the starting value of the second sub-table to the user terminal UE, so that the use of the second sub-table is explicitly reported.

As shown in FIG. 17, when the first sub-table and the second sub-table are provided, the radio base station BS reports an operation result that is acquired based on the MCS to indicate the modulation order and the TBS index corresponding to the modulation scheme and the coding rate that apply to the PDSCH, and the starting value of the second sub-table, to the user terminal UE. Meanwhile, the user terminal UE retrieves the MCS to correspond to the modulation scheme and the coding rate that are applied to the PDSCH, based on the value reported from the radio base station BS and the starting value of the second sub-table.

For example, assume that, as shown in FIG. 17, when the maximum MCS value is "39" and the starting value of the second sub-table is "8," the MCS to correspond to the modulation scheme and the coding rate that are applied to the PDSCH is "34." In this case, the radio base station BS may transmit the operation result "26," produced by following equation 6, to the radio base station BS.

(the maximum MCS value−the starting value of the second sub-table+MCS)

mod the maximum MCS value

=(39−8+34)mod 39=26                 (Equation 6)

Furthermore, the user terminal UE may retrieve the MCS "34," which corresponds to the modulation scheme and the coding rate that are applied to the PDSCH, according to following equation 7, based on the value reported from the radio base station BS and the starting value of the second sub-table.

(the value reported from the radio base station BS+the starting value of the second sub-table)

mod the maximum MCS value

=(26+8)mod 39=34                 (Equation 7)

Note that the operation result in the radio base station BS is transmitted by using, for example, the MCS field in the DCI. According to equation 6, in the case illustrated in FIG. 17, the operation results of the MCSs "8" to "39" included in the second sub-table are "0" to "31." Also, since the use of the second sub-table is explicitly reported from the radio base station BS to the user terminal UE, it is possible to uniquely identify the modulation schemes, including 256 QAM, and the coding rates without expanding the five-bit MCS filed in the DCI.

Figure 18:
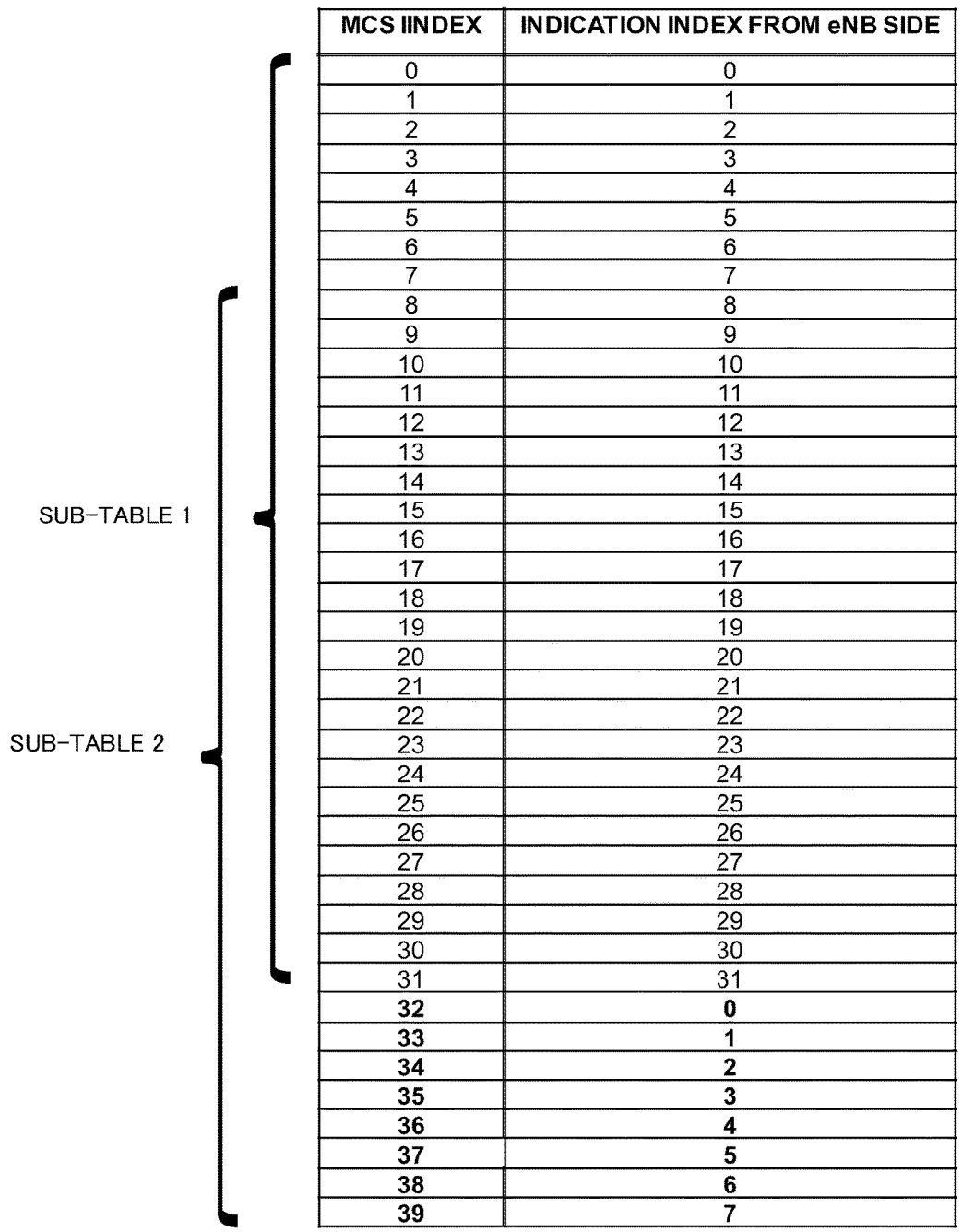
FIG. 18 is a diagram to explain an adaptive modulation and coding method according to aspect 2.2 of the present invention.

Next, with reference to FIG. 18, a case will be described below where the use of sub-tables is not explicitly reported. In this case, as shown in FIG. 18, the MCS table may include a first sub-table (SUB-TABLE 1), which covers the MCSs from the minimum value (here, "0") to a final value (here, "31") that is smaller than the maximum value, and a second sub-table (SUB-TABLE 2), which covers the MCSs from the starting value (here, "8"), which is larger than the minimum value, to the maximum value (here, "39"). Note that, although, in FIG. 18, MCSs and values that are reported from the radio base station BS are associated with each other, it is equally possible to furthermore associate MCSs, modulation orders and TBS indices with each other as shown in FIG. 14. Note that the values to be reported from the radio base station BS need not be associated explicitly, as long as they are operated based on MCSs.

When the use of the second sub-table is not explicitly reported, the radio base station BS judges whether or not the second sub-table is used based on CQI history, and retrieves the MCS to correspond to the modulation scheme and the coding rate that are applied to the PDSCH, based on the result of that judgment.

To be more specific, the radio base station BS feeds back an operation result that is acquired based on the MCS indicating the modulation order and the TBS indicator to corresponds to the modulation scheme and the coding rate that are applied to the downlink shared channel (PDSCH), to the user terminal UE. Meanwhile, the user terminal UE judges whether or not the second sub-table is used based on MCS history, and, based on the result of this judgement and the values reported from the radio base station BS, retrieves the MCS to correspond to the modulation scheme and the coding rate to be applied to the PDSCH.

For example, when, as shown in FIG. 18, the number of MCSs included in the first sub-table is "32," the user terminal UE may transmit the operation result acquired by following equation 8 to the radio base station BS.

(MCS)mod 32                 (Equation 8)

Here, when the value reported from the radio base station BS is "1," the MCS is "1" if the first sub-table is used. On the other hand, the MCS is "33" if the second sub-table is used. So, the user terminal UE judges whether or not the second sub-table is used based on the history of retrieved MCSs.

For example, if the previous MCS was equal to or greater than a predetermined value (for example, "28"), the user terminal UE judges that the second sub-table is used, and makes the present MCS "33." On the other hand, if the previous MCS was lower than the predetermined value (for example, "28"), the user terminal UE judges that the second sub-table is not used (the first sub-table is used), and makes the present MCS "1."

Alternatively, when the value reported from the radio base station BS is a predetermined value (for example, "28"), the user terminal UE may judge that the second sub-table is used for later report values. Meanwhile, when the value reported from the radio base station BS is a predetermined value (for example, "8"), the user terminal UE may judge that the second sub-table is not used (the first sub-table is used) for later feedback values.

Note that the report values from the radio base station BS may be transmitted by using, for example, the MCS field in DCI transmitted by the PDCCH. According to equation 8, in the case illustrated in FIG. 18, the operation results of the CQIs "1" to "39" included in the first sub-table and the second sub-table are "0" to "31." Also, the user terminal UE can judge whether or not the second sub-table is used, based on the history of retrieved MCSs. Consequently, it is possible to uniquely identify the modulation schemes, including 256 QAM, and the coding rates, without expanding the five-bit MCS field in DCI. Also, as examples of making advanced use of a plurality of sub-tables, a method of switching between tables depending on the type of the connecting radio base station BS, and a method of switching between tables depending on the capabilities of user terminals UE may be included.

(Aspect 2.3)

With the adaptive modulation and coding method according to aspect 2.3, a sampled table is provided without increasing the number of MCS bits in the MCS table. This makes it possible to uniquely identify the modulation schemes, including 256 QAM, and the coding rates without changing the number of bits to report from the radio base station BS to the user terminal UE.

To be more specific, as shown in FIG. 19, an MCS table, in which combinations of modulation orders and TBS indices in the MCS table shown in FIG. 14 are linearly punctured, and a predetermined number of (here, 32 patterns of) combinations are sampled, may be used. For example, in FIG. 19, two combinations of modulation orders and TBS indices are punctured in each modulation order—namely, the modulation order "2" of QPSK, the modulation order "4" of 16 QAM, the modulation order "6" of 64 QAM and the modulation order "8" of 256 QAM.

Furthermore, as shown in FIG. 20, an MCS table, in which combinations of modulation orders and TBS indices in the MCS table shown in FIG. 14 are non-linearly punctured, and a predetermined number of (here, 32 patterns of) combinations are sampled, may be used. For example, in FIG. 20 where there are the modulation order "2" of QPSK, the modulation order "4" of 16 QAM and the modulation order "6" of 64 QAM, more combinations are punctured as the modulation order becomes smaller. In an environment where a high-order modulation scheme such as 256 QAM is employed, the likelihood that low-order modulation schemes such as QPSK and 16 QAM are employed is likely to be low. Consequently, by puncturing more combinations from the low-order modulation schemes, it is possible to further improve the spectral efficiency that is made possible by the application of the high-order modulation scheme.

With the above adaptive modulation and coding method according to aspect 2.3, a sampled table to match the number of conventional MCS bits (for example, five bits) is provided. Consequently, it is possible to uniquely identify the modulation schemes, including 256 QAM, and the coding rates without expanding the legacy MCS field in DCI.

(Aspect 2.4)

With the adaptive modulation and coding method according to aspect 2.4, similar to aspect 2.3, a sampled table, in which combinations of the modulation orders of predetermined modulation schemes and TBS indices are sampled, is provided without increasing the number of MCS bits in the MCS table.

To be more specific, with the adaptive modulation and coding method according to aspect 2.4, the combinations of the modulation orders of low-order modulation schemes (for example, QPSK) and TBS indices are maintained. Meanwhile, the combinations of the modulation orders of high-order modulation schemes (for example, 16 QAM, 64 QAM, 256 QAM and so on) and TBS indices are punctured, depending on the level of contribution to throughput. The level of contribution to throughput here may be shown by the increment of spectral efficiency, the usage rate of the MCS, and so on.

For example, with the MCS table shown in FIG. 40B, the combinations of the modulation order "2" of QPSK with TBS indices are not punctured but maintained. User terminals UE on cell edges may use the combinations of low-order QPSK and TBS indices. Consequently, by maintaining the combinations of the modulation order "2" of QPSK and TBS indices, it is possible to prevent the user terminals UE on cell edges from being incapable of reception with desired received quality.

Figure 40A:
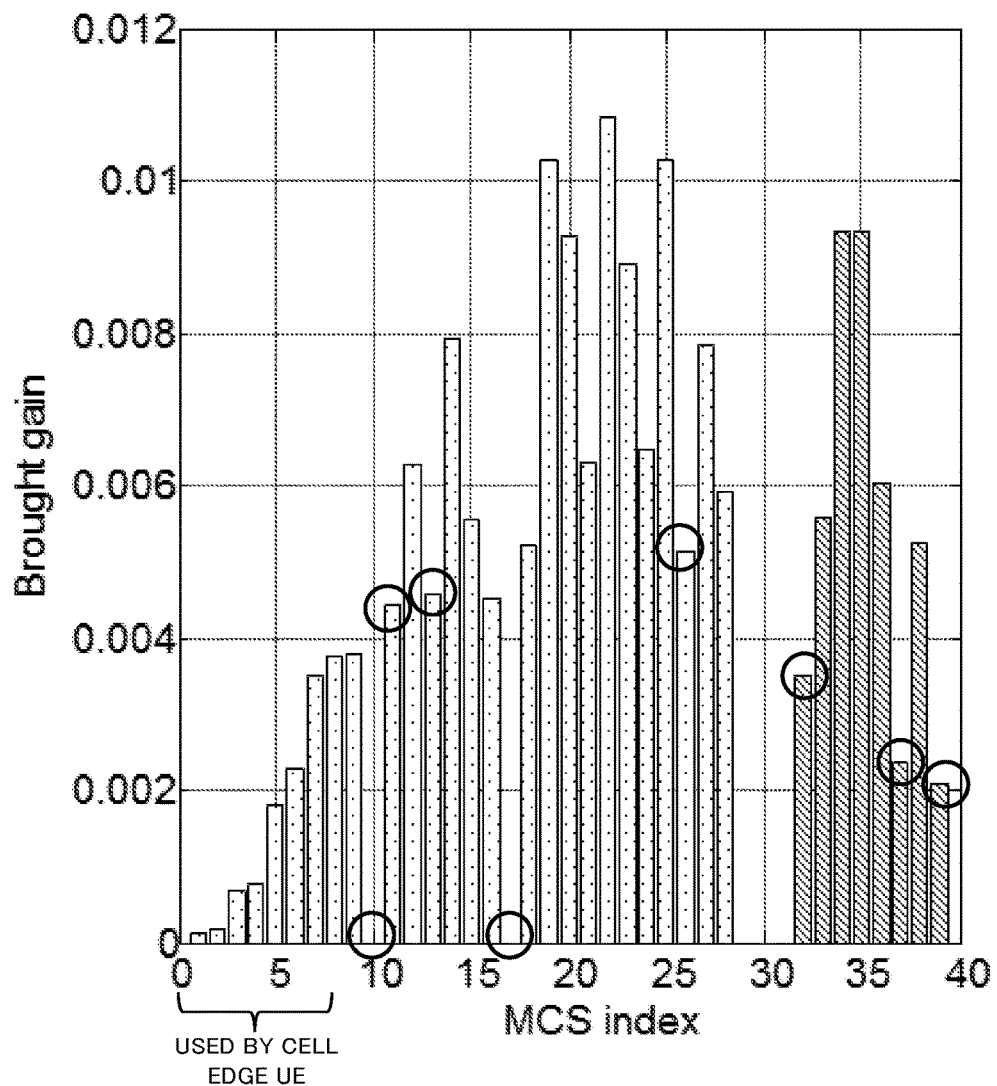
FIG. 40A is a diagram to explain an adaptive modulation and coding method according to aspect 2.4 of the present invention.

Meanwhile, in the MCS table shown in FIG. 40B, combinations to show lower levels of contribution to throughput are selected from among the combinations of the modulation orders "4," "6" and "8" of the modulation schemes of higher orders than 16 QAM and TBS indices, and punctured. In FIG. 40A, the modulation schemes of higher orders than 16 QAM show relatively low gain (which is the level of contribution to throughput) in MCS=10, 11, 13, 17, 26, 32, 37 and 39. Consequently, in the MCS table shown in FIG. 40B, the combinations of modulation orders and TBS indices corresponding to MCS=10, 11, 13, 17, 26, 32, 37 and 39 are punctured. Note that FIG. 40B is simply an example, and different puncturing from that of FIG. 40B may be carried out as well.

With the above adaptive modulation and coding method according to aspect 2.4, while the combinations of low modulation orders and coding rates are maintained, combinations to show lower levels of contribution to throughput from among the combinations of higher modulation orders and coding rates are punctured. Consequently, it is possible to secure desired received quality in cell-edge user terminals UE, while preventing the number of MCS bits in the MCS table from increasing.

(Aspect 2.5)

With the adaptive modulation and coding method according to aspect 2.5, instead of puncturing combinations of predetermined modulation orders and TBS indices (see examples 2.3 and 2.4), combinations of predetermined modulation orders and TBS indices are replaced with combinations of modulation schemes of higher orders than 64 QAM (for example, 256 QAM) and coding rates. In this way, by replacing combinations of conventional modulation orders and TBS indices, it is possible to support combinations of the modulation order "8" of 256 QAM and TBS indices, without increasing the number of MCS bits in the MCS table.

To be more specific, as shown in FIG. 41, an MCS table, in which combinations of predetermined modulation orders and TBS indices in the MCS table shown in FIG. 3 are linearly replaced with combinations of the modulation order "8" of 256 QAM and TBS indices, may be used.

Furthermore, as shown in FIG. 42, an MCS table, in which combinations of predetermined modulation orders and TBS indices in the MCS table shown in FIG. 3 are non-linearly replaced with combinations of the modulation order "8" of 256 QAM and TBS indices, may be used as well. For example, in FIG. 42, combinations of lower modulation orders such as QPSK and TBS indices are replaced with combinations of the modulation order "8" of 256 QAM and TBS indices. Note that the combinations of modulation orders and TBS indices to be replaced may be selected based on received quality (for example, the SINR and/or the like).

In an environment (for example, a small cell) where a high-order modulation scheme such as 256 QAM is employed, the likelihood that low-order modulation schemes such as QPSK are employed is likely to be low. Consequently, by replacing more combinations from the low modulation orders, it is possible to further improve the spectral efficiency that is made possible by the application of the high-order modulation scheme.

Note that FIG. 41 and FIG. 42 are simply examples, and different replacement from those of FIG. 41 and FIG. 42 may be carried out as well. Also, in the MCS table, in addition to MCSs, modulation orders and TBS indices, it is equally possible to associate spectral efficiency, coding rates and/or the like (see FIG. 14).

With the above adaptive modulation and coding method according to aspect 2.5, it is possible to maintain the number of conventional MCS bits (for example, five bits). Consequently, it is possible to uniquely identify the modulation schemes, including 256 QAM, and the coding rates without expanding the legacy MCS field in DCI.

(Aspect 3)

With the adaptive modulation and coding method according to aspect 3 of the present invention, a user terminal UE receives modulation and coding information (MCS) for a downlink shared channel (PDSCH). Also, from an MCS table, in which MCSs, modulation orders and TBS indices are associated with each other, the user terminal UE acquires the modulation order and the transport block size (TBS) index that correspond to the MCS received from the radio base station BS. Also, the user terminal demodulates the PDSCH based on the modulation order that is acquired. Furthermore, with reference to a TBS table, in which TBS indices and TBSs are associated with each other, the user terminal UE decodes the PDSCH based on the TBS corresponding to the TBS index that is acquired. Here, the TBSs in the TBS table include TBSs that correspond to modulation schemes of higher orders than 64 QAM.

To be more specific, with the adaptive modulation and coding method according to aspect 3, as shown in FIG. 4 and FIG. 21 to FIG. 31, a TBS table, in which TBS indices and transport block sizes (TBSs), which match the number of PRBs (N_PRB) per transport block (TB), are associated with each other, is used.

With modulation schemes of higher orders than 64 QAM (for example, 256 QAM), the TBS to match the number of PRBs per transport block is likely to be big compared to modulation schemes of lower orders such as QPSK, 16 QAM and 64 QAM. So, as shown in FIG. 21 to FIG. 31, in the TBS table, TBSs to match the number of PRBs per TB are defined in association with the TBS indices "27" to "34" in the MCS table (see FIG. 14).

Note that, in the TBS table shown in FIG. 21, the TBSs to correspond to the number of PRBs per TB in the TBS indices "0" to "26" may use the values laid out in FIG. 4. Also, the number of PRBs per TB (N_PRB) increases as the system bandwidth expands. For example, in FIG. 4 and FIG. 21, the TBSs for when the number of PRBs per TB is "1" to "10" are defined. Also, in FIG. 22, the TBSs for when the number of PRBs per TB is "11" to "20" are defined. Similarly, in FIG. 23 to FIG. 31, the TBSs for when the number of PRBs per TB is "21" to "110" are defined.

The user terminal UE acquires the modulation order and the TBS index that correspond to the MCS that is reported from the radio base station BS, from the MCS table (for example, FIG. 14). The user terminal UE acquires the TBS that corresponds to the acquired TBS index and the number of PRBs per TB included in the DCI, from the TBS table (for example, FIG. 4, and FIG. 21 to FIG. 31). Based on the TBS that is acquired, the user terminal UE calculates the coding rate according to, for example, above equation 1, and decodes the PDSCH by using the calculated coding rate.

As described above, by using a TBS table that defines TBSs supporting high-order modulation schemes, it is possible to apply bigger TBSs and coding rates to the PDSCH when high-order modulation schemes are employed. As a result of this, it is possible to enhance the effect of improving throughput by means of adaptive modulation and coding.

(Structure of Radio Communication System)

Now, the structure of the radio communication system according to the present embodiment will be described below. In this radio communication system, the above-described adaptive modulation and coding methods (including aspect 1, aspect 2 and aspect 3) are employed. A schematic structure of a radio communication system according to the present embodiment will be described below with reference to FIG. 32 to FIG. 36.

Figure 32:
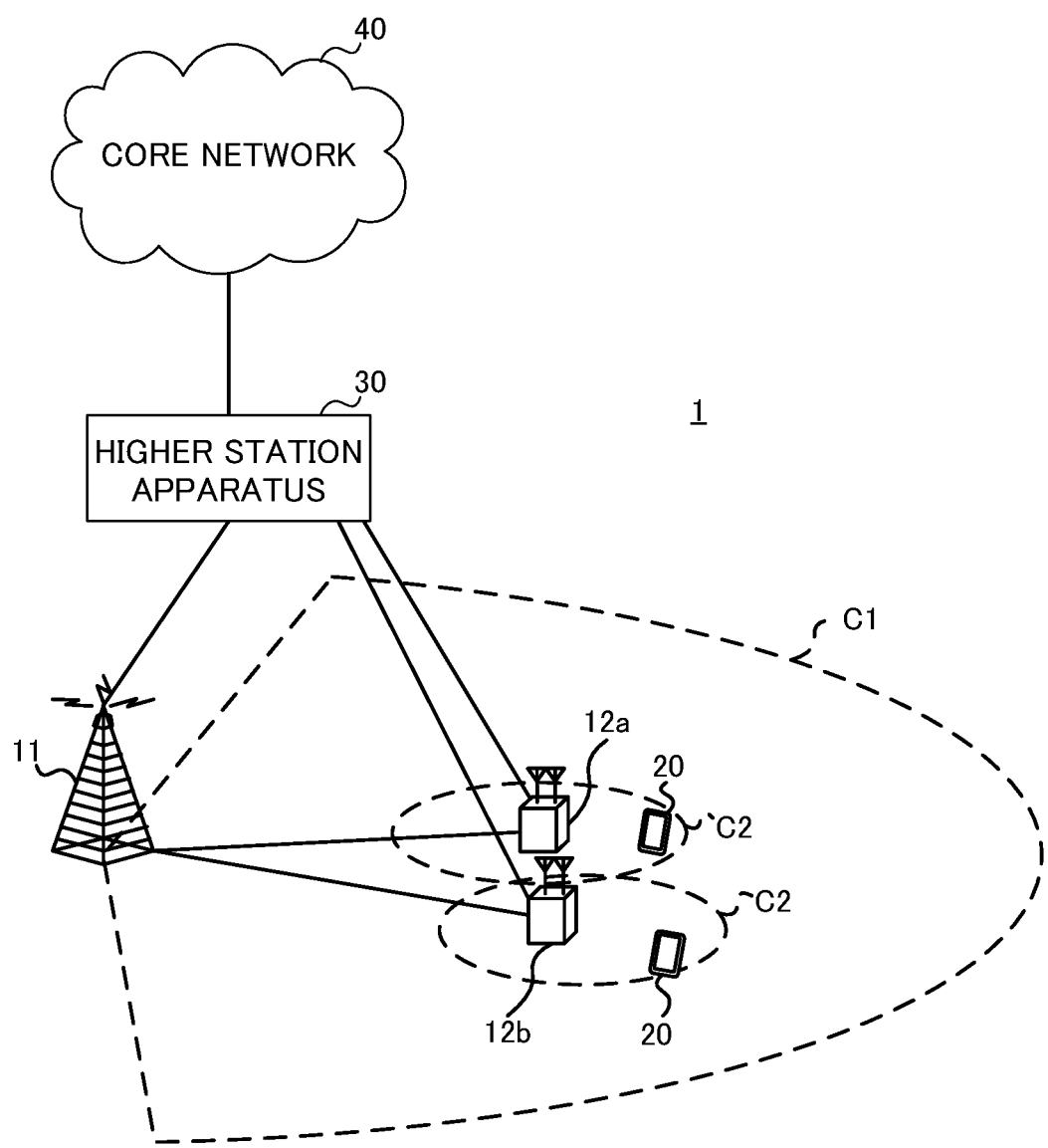
FIG. 32 is a schematic diagram to show an example of a radio communication system according to the present embodiment.
Figure 33:
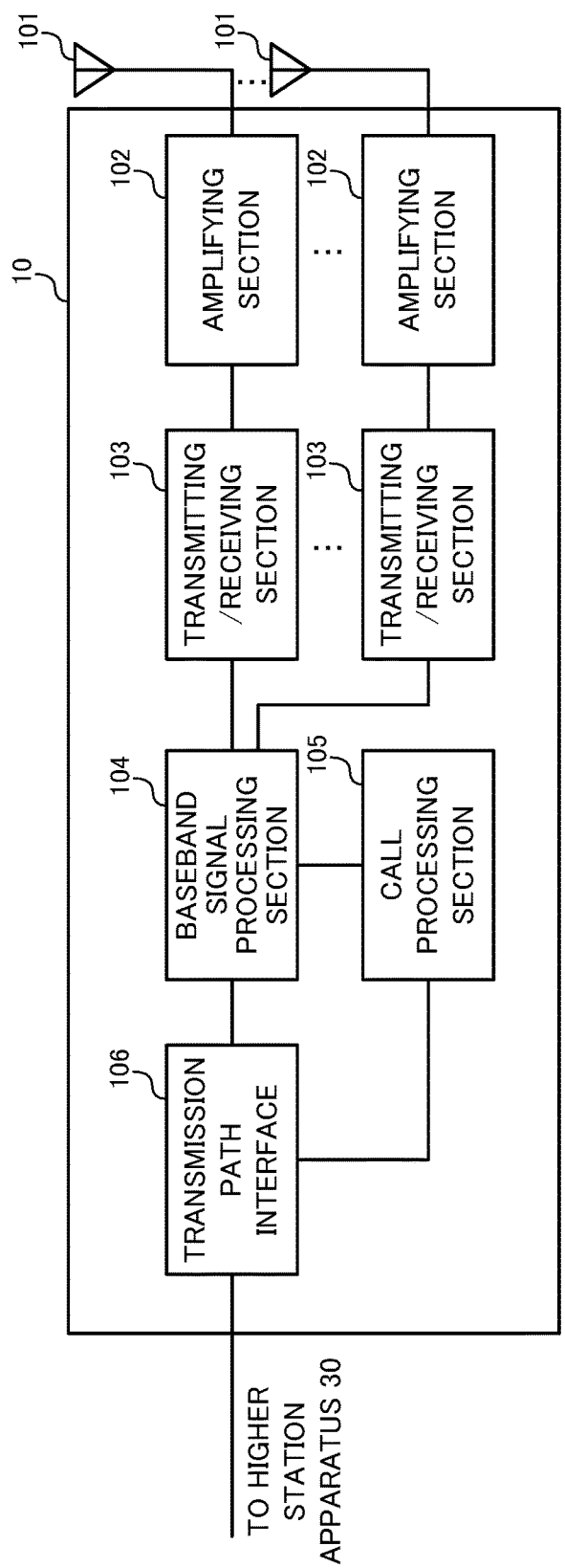
FIG. 33 is a diagram to explain an overall structure of a radio base station according to the present embodiment.

FIG. 32 is a schematic structure diagram of the radio communication system according to the present embodiment. Note that the radio communication system shown in FIG. 32 is a system to accommodate, for example, an LTE system, an LTE-A system, IMT-advanced, 4G, FRA (Future Radio Access) and so on.

As shown in FIG. 32, a radio communication system 1 includes a macro base station 11 that forms a macro cell C1, and small base stations 12a and 12b that form small cells C2, which are placed inside the macro cell C1 and which are narrower than the macro cell C1. Also, in the macro cell C1 and in each small cell C2, user terminals 20 are placed. The user terminals 20 are configured to be able to perform radio communication with both the macro base station 11 and the small base stations 12.

In the macro cell C1 and the small cells C2, the same frequency band may be used, or different frequency bands may be used. When different frequency bands are used between the macro cell C1 and the small cells C2, in the macro cell C1, for example, a relatively low frequency F1 such as 800 MHz and 2 GHz may be used, while, in the small cells C2, for example, a relatively high frequency F2 such as 3.5 GHz and 10 GHz may be used. Note that a carrier of frequency F1 may be referred to as a "conventional carrier," a "legacy carrier," a "coverage carrier" and so on. Also, a carrier of frequency F2 may be referred to as a "NCT (New Carrier Type)," an "additional carrier," a "capacity carrier" and so on.

The macro base station 11 and each small base station 12 may be connected by wire or may be connected by wireless. The macro base station 11 and the small base stations 12 are each connected to a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB," a "radio base station apparatus," a "transmission point" and so on. Also, the small base stations 12 are radio base stations to have local coverages, and may be referred to as "RRHs (Remote Radio Heads)," "pico base stations," "femto base stations," "Home eNodeBs," "transmission points," "eNodeBs" and so on.

Furthermore, the small cells C2 that are formed by the small base stations 12 may be a type of cells in which the PDCCH is arranged in maximum three OFDM symbols at the top of a subframe, or may be a type of cells (NCT) in which this PDCCH is not arranged.

The macro base station 11 and the small base stations 12 will be collectively referred to as a "radio base station 10," unless distinction needs to be drawn otherwise. The user terminals 20 are terminals to support various communication schemes such as LTE, LTE-A and so on, and may include both mobile communication terminals and fixed communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Now, communication channels used in the radio communication system shown in FIG. 32 will be described below. Downlink communication channels include a PDSCH (downlink shared data channel), which is used by each user terminal 20 on a shared basis, and downlink L1/L2 control channels (a PDCCH, a PCFICH, a PHICH and an EPDCCH). User data and higher control information are transmitted by the PDSCH. Scheduling information for the PDSCH and the PUSCH, and so on are transmitted by the PDCCH. The number of OFDM symbols to use for the PDCCH is transmitted by the PCFICH (Physical Control Format Indicator CHannel). HARQ ACKs and NACKs for the PUSCH are transmitted by the PHICH (Physical Hybrid-ARQ Indicator CHannel). Also, the scheduling information for the PDSCH and the PUSCH and so on may be transmitted by the EPDCCH as well. This EPDCCH (enhanced downlink control channel) is frequency-division-multiplexed with the PDSCH.

Uplink communication channels include the PUSCH (uplink shared data channel), which is used by each user terminal 20 on a shared basis, and a PUCCH (Physical Uplink Control CHannel), which is an uplink control channel. User data and higher control information are transmitted by this PUSCH. Also, by means of the PUCCH, downlink radio quality information (CQI: Channel Quality Indicator), ACKs, NACKs and so on are transmitted.

FIG. 7 is a diagram to show an overall structure of a radio base station 10 (which may be either a macro base station 11 or a small base station 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, a PDCP layer process, division and coupling of user data, an RLC (Radio Link Control) layer transmission process such as a RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control signals are also subjected to transmission processes such as channel coding and an inverse fast Fourier transform, and transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, user data that is included in the input uplink signals is subjected to an FFT process, an IDFT process, error correction decoding, a MAC retransmission control receiving process, and RLC layer and PDCP layer receiving processes, and transferred to the higher station apparatus 30 via the transmission path interface 106. The call processing section 105 performs call processing such as setting up and releasing communication channels, manages the state of the radio base station 10 and manages the radio resources.

Figure 34:
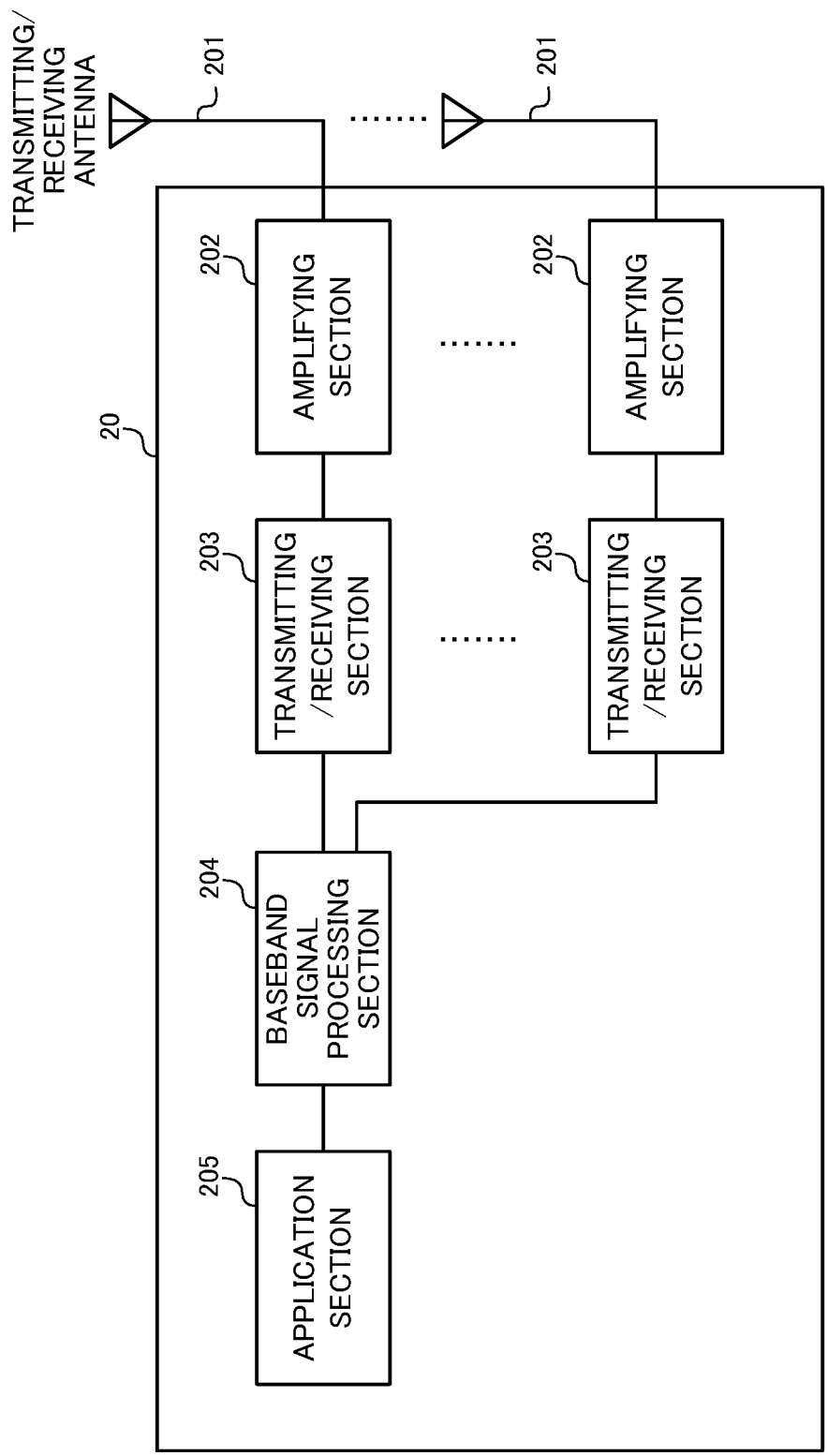
FIG. 34 is a diagram to explain an overall structure of a user terminal according to the present embodiment.

FIG. 34 is a diagram to show an overall structure of a user terminal 20 according to the present embodiment. The user terminal 20 has a plurality of transmitting/receiving antennas 201 for MIMO transmission, amplifying sections 202, transmitting/receiving sections 203, a baseband signal processing section 204 and an application section 205.

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that is included in the downlink signals is transferred to the application section 205. The application section 205 performs processes related to higher layers above the physical layer and the MAC layer. The broadcast information in the downlink data is also transferred to the application section 205.

Meanwhile, uplink user data is input from the application section 205 into the baseband signal processing section 204. The baseband signal processing section 204 performs a retransmission control (HARQ (Hybrid ARQ)) transmission process, channel coding, pre-coding, a DFT process, an IFFT process and so on. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Next, functional structures of a radio base station 10 (which may be either a macro base station 11 or a small base station 12) and a user terminal 20 will be described in detail with reference to FIG. 35 and FIG. 36.

Figure 35:
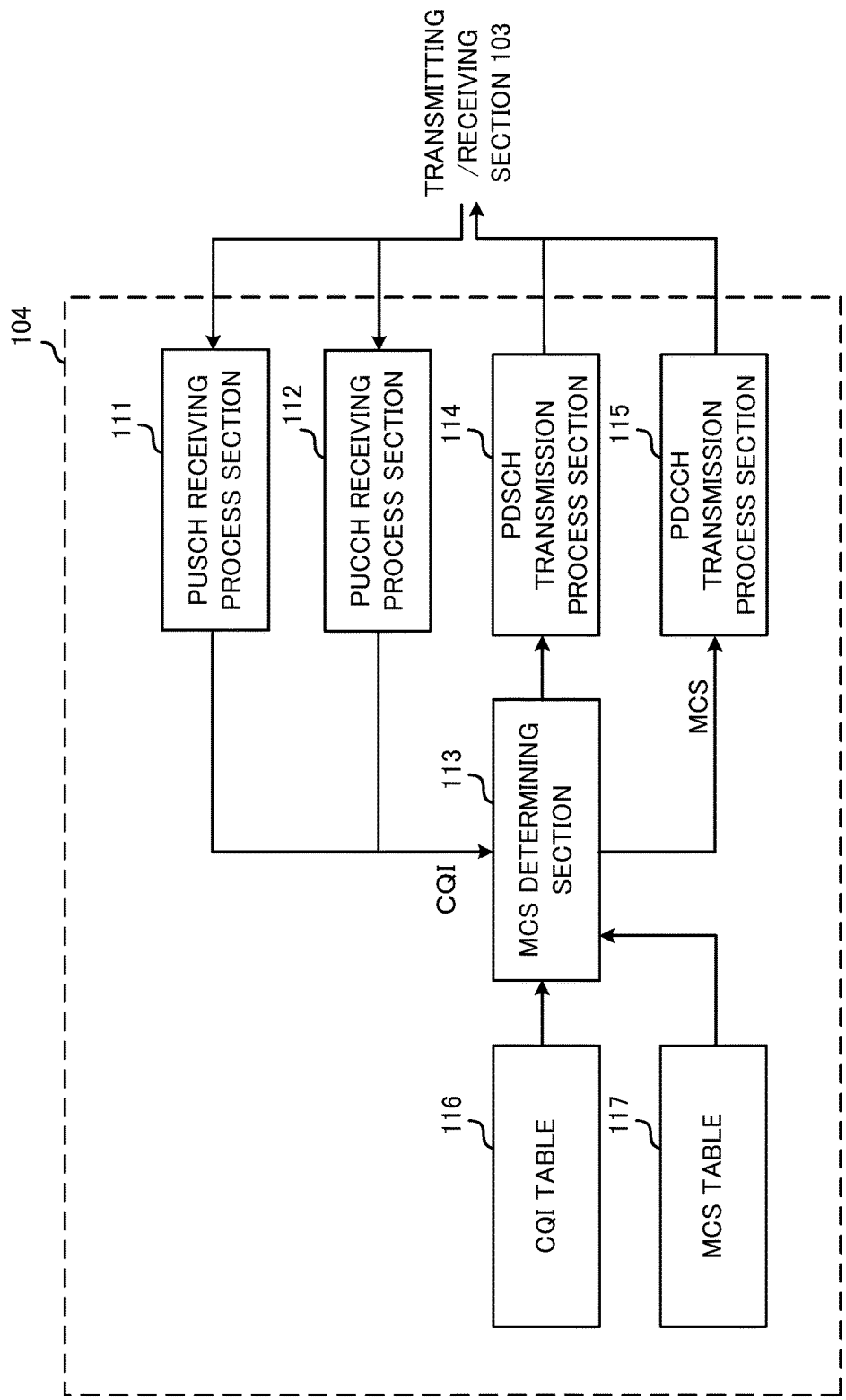
FIG. 35 is a diagram to explain a functional structure of a radio base station according to the present embodiment.

FIG. 35 is a diagram to show a functional structure of a radio base station 10 according to the present embodiment. Note that the following functional structure is formed with the baseband signal processing section 104 and so on provided in the radio base station 10. As shown in FIG. 35, the radio base station 10 has a PUSCH receiving process section 111, a PUCCH receiving process section 112, an MCS determining section 113, a PDSCH transmission process section 114, a PDCCH transmission process section 115, a CQI table 116 and an MCS table 117.

The PUSCH receiving process section 111 performs receiving processes (for example, demodulation, decoding, etc.) of the user data and higher layer control information by the PUSCH. To be more specific, the PUSCH receiving process section 111 acquires the channel quality indicator (CQI) that is fed back from the user terminal 20 through the PUSCH.

Here, the PUSCH receiving process section 111 may acquire the CQI by using a CQI field of expanded size (aspect 1.1). Also, the PUSCH receiving process section 111 may acquire an operation result based on the CQI as well (aspect 1.2).

The PUCCH receiving process section 112 performs receiving processes (for example, demodulation, decoding, etc.) of the uplink control information (UCI) by the PUCCH. To be more specific, the PUCCH receiving process section 112 acquires the CQI that is fed back from the user terminal 20 through the PUCCH.

Here, the PUCCH receiving process section 112 may acquire the CQI by using a CQI field of expanded size (aspect 1.1). Also, the PUCCH receiving process section 112 may acquire a CQI in which the first bit part (legacy bit) and the second bit part (additional bit) are joint-encoded (see aspect 1.1 and FIG. 8). In this case, the extended CP of PUCCH format 2 may be used. Also, the PUCCH receiving process section 112 may acquire the CQI by using the CQI field and the reference signal field (see aspect 1.1 and FIG. 9). In this case, PUCCH formats 2a/2b may be used. Also, the PUCCH receiving process section 112 may acquire an operation result based on the CQI (aspect 1.2).

The MCS determining section 113 determines the modulation scheme and the coding rate to apply to the downlink shared channel (PDSCH) based on the CQI acquired in the PUSCH receiving process section 111 or the PUCCH receiving process section 112. To be more specific, the MCS determining section 113 acquires the modulation scheme and the coding rate to correspond to the CQI acquired in the PUSCH receiving process section 111 or the PUCCH receiving process section 112 from the CQI table 116.

Also, the MCS determining section 113 may retrieve the CQI based on the feedback value that is acquired in the PUSCH receiving process section 111 or the PUCCH receiving process section 112 (aspect 1.2). Note that the CQI may be retrieved based on the starting value of the second sub-table in the CQI table, or may be retrieved based on past CQI history.

Also, the MCS determining section 113 determines the modulation and coding information (MCS) of the PDSCH. To be more specific, the MCS determining section 113 acquires the MCS to correspond to the modulation scheme and the coding rate that are acquired from the CQI table 116, from the MCS table 117. Note that the MCS indicates the modulation order and the transport size (TBS) index to correspond to the above modulation scheme and coding rate.

The PDSCH transmission process section 114 performs transmission processes (for example, coding, modulation, etc.) of the user data and higher layer control information by the PDSCH. To be more specific, the PDSCH transmission process section 114 modulates and encodes the PDSCH by using the modulation scheme and the coding rate that are determined in the MCS determining section 113.

The PDCCH transmission process section 115 performs transmission processes (for example, coding, modulation, etc.) of the downlink control information (DCI) by the PDCCH. To be more specific, the PDCCH transmission process section 115 generates DCI that contains the MCS determined in the MCS determining section 113, and transmits this DCI via the transmitting/receiving section 103.

Here, the PDCCH transmission process section 115 may transmit the MCS by using an MCS field of expanded size (aspect 2.1). Also, the PDCCH transmission process section 115 may transmit the MCS by using the MCS field in the DCI, and the masking of the CRC (Cyclic Redundancy Check) that is attached to the DCI (aspect 2.1 and FIG. 15). In this case, the first bit part (legacy bit) of the MCS is placed in the MCS field in the DCI, and the CRC may be masked with a sequence to represent the second bit part (additional bit) of the MCS. Also, the PDCCH transmission process section 115 may transmit an operation result that is acquired based on the MCS (aspect 2.2).

The CQI table 116 is a table in which CQIs, modulation schemes and coding rates are associated with each other. The CQI table 116 includes modulation schemes of higher orders than 64 QAM (for example, 256 QAM) (FIG. 7).

Here, the CQI table 116 may include a first sub-table, which covers the CQIs from the minimum value to a final value that is smaller than the maximum value, and a second sub-table, which covers the CQIs from the starting value, which is bigger than the minimum value, to the maximum value (aspect 1.2, FIG. 10 and FIG. 11). Also, in the CQI table 116, combinations of modulation schemes and coding rates may be punctured, linearly or non-linearly, so as to prevent the size of the CQI field in the PUCCH or the PUSCH from increasing (see aspect 1.3, FIG. 12 and FIG. 13).

Also, in the CQI table 116, it is possible to maintain the combinations of low-order modulation schemes (for example, QPSK) and coding rates, and puncture combinations of high-order modulation schemes (for example, 16 QAM, 64 QAM, 256 QAM and so on) and coding rates depending on the level of contribution to throughput (see aspect 1.4 and FIG. 37).

Also, in the CQI table 116, combinations of one of QPSK, 16 QAM and 64 QAM, and coding rates may be replaced, linearly or non-linearly, with combinations of modulation schemes of higher orders than 64 QAM (for example, 256 QAM) and coding rates (see aspect 1.5, FIG. 38 and FIG. 39).

Note that it is also possible to use a CQI table that does not contain modulation scheme of higher orders than 64 QAM (FIG. 2) when the radio base station 10 is a macro base station 11, and use a CQI table 116 that contains modulation scheme of higher orders than 64 QAM (FIG. 7) when the radio base station 10 is a small base station 12.

The MCS table 117 is a table, in which MCSs, modulation orders and TBS indices to show transport block sizes (TBSs) are associated with each other. The MCS table 117 contains the modulation orders of modulation schemes of higher orders than 64 QAM (for example, 256 QAM) (FIG. 14).

Here, the MCS table 117 may include a first sub-table, which covers the MCSs from the minimum value to a final value that is smaller than the maximum value, and a second sub-table, which covers the MCSs from the starting value, which is bigger than the minimum value, to the maximum value (see aspect 2.2, FIG. 17 and FIG. 18). Also, in the MCS table 117, combinations of modulation orders and TBS indices may be punctured, linearly or non-linearly, so as to prevent the size of the MCS field in the DCI from increasing (aspect 2.3, FIG. 19 and FIG. 20).

Also, in the MCS table 117, it is possible to maintain the combinations of the modulation orders of low-order modulation schemes (for example, QPSK) and MCS indices, and puncture combinations of the modulation orders of high-order modulation schemes (for example, 16 QAM, 64 QAM, 256 QAM and so on) and MCS indices depending on the level of contribution to throughput (see aspect 2.4 and FIG. 40).

Also, in the MCS table 117, combinations of one of QPSK, 16 QAM and 64 QAM, and MCS indices may be replaced, linearly or non-linearly, with combinations of the modulation orders of modulation schemes of higher orders than 64 QAM (for example, 256 QAM) and MCS indices (see aspect 2.5, FIG. 41 and FIG. 42).

Note that it is possible to use an MCS table (FIG. 3) that does not contain the modulation orders of modulation schemes of higher orders than 64 QAM when the radio base station 10 is a macro base station 11, and use an MCS table 117 (FIG. 14) that contains the modulation orders of modulation schemes of higher orders than 64 QAM when the radio base station 10 is a small base station 12.

Figure 36:
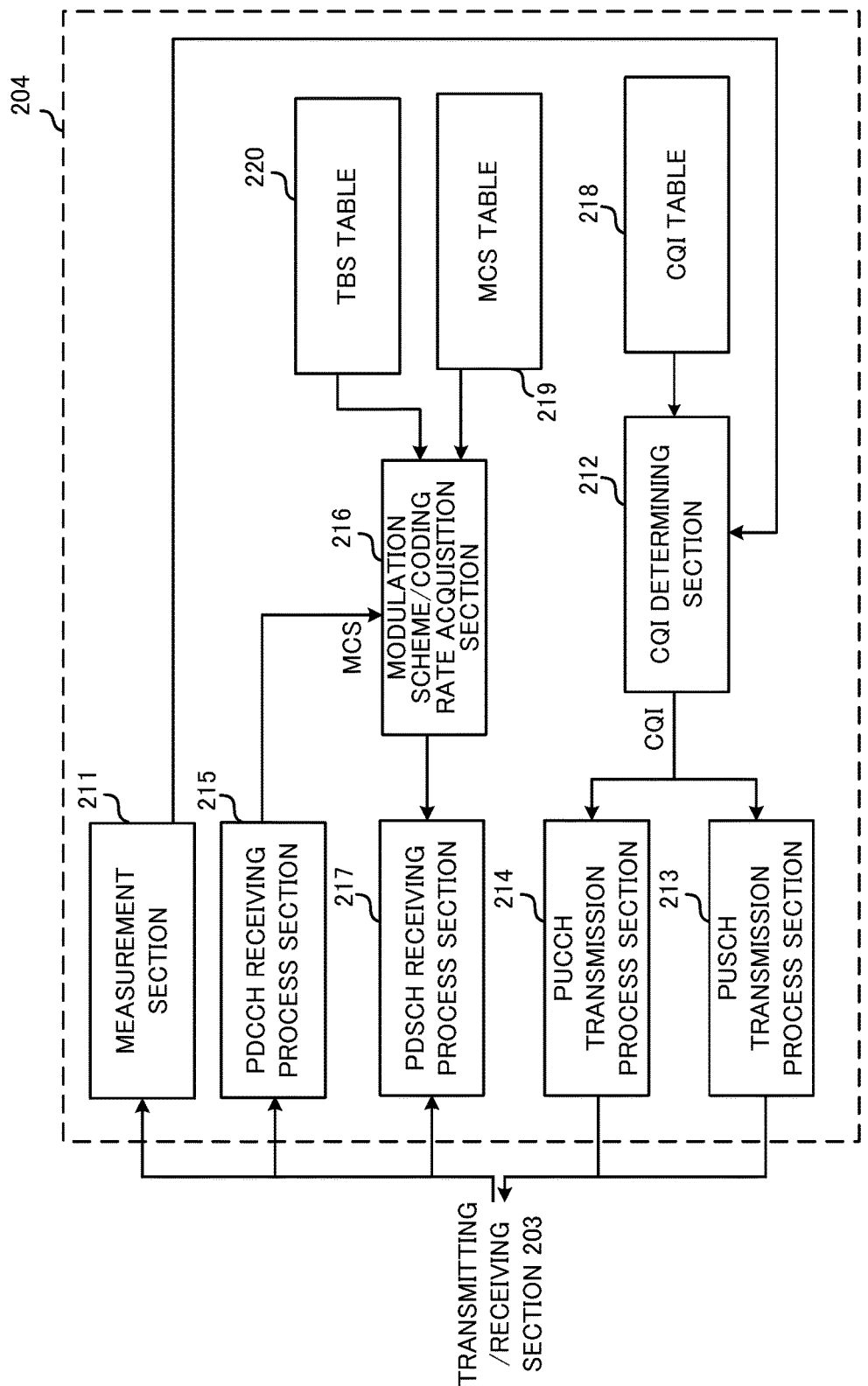
FIG. 36 is a diagram to explain a functional structure of a user terminal according to the present embodiment.

FIG. 36 is a diagram to show a functional structure of a user terminal 20 according to the present embodiment. Note that the following functional structure is formed with the baseband signal processing section 204 and so on provided in user terminal 20. As shown in FIG. 36, the user terminal 20 has a measurement section 211, a CQI determining section 212, a PUSCH transmission process section 213, a PUCCH transmission process section 214, a PDCCH receiving process section 215, a modulation scheme/coding rate acquisition section 216, a PDSCH receiving process section 217, a CQI table 218, an MCS table 219 and a TBS table 220.

The measurement section 211 measures the channel quality of reference signals from the radio base station 10. The channel quality is, for example, the SNR, the SINR and so on.

The CQI determining section 212 acquires the CQI to correspond to the modulation scheme and the coding rate that are applicable to the PDSCH in the channel quality measured in the measurement section 211, from the CQI table 218. Here, the modulation scheme and the coding rate that are applicable to the PDSCH are, for example, a modulation scheme and a coding rates to fulfill the condition of making the block error rate (BLER) of the PDSCH 10%.

The PUSCH transmission process section 213 carries out transmission processes (for example, coding, modulation, etc.) of the user data and higher layer control information by the PUSCH. To be more specific, the PUSCH transmission process section 213 transmits the CQI determined in the CQI determining section 212 via the transmitting/receiving section 203.

Here, the PUSCH transmission process section 213 may transmit the CQI using a CQI field of expanded size (aspect 1.1). Also, the PUSCH transmission process section 213 may transmit an operation result that is acquired based on the CQI (aspect 1.2).

The PUCCH transmission process section 214 performs transmission processes (for example, coding, modulation, etc.) of the uplink control information (UCI) by the PUCCH. To be more specific, the PUCCH transmission process section 214 transmits the CQI that is determined in the CQI determining section 212 via the transmitting/receiving section 203.

Here, the PUCCH transmission process section 214 may transmit the CQI by using a CQI field of expanded size (aspect 1.1). Also, the PUCCH transmission process section 214 may transmit the CQI by carrying out joint encoding of the first bit part (legacy bit) and the second bit part (additional bit). In this case, the extended CP of PUCCH format 2 may be used. Also, the PUCCH transmission process section 214 may transmit the CQI by using the CQI field and the reference signal field (aspect 1.1 and FIG. 9). In this case, PUCCH formats 2a/2b may be used. Furthermore, the PUCCH transmission process section 214 may transmit an operation result that is acquired based on the CQI (aspect 1.2).

The PDCCH receiving process section 215 performs receiving processes (for example, blind decoding, demodulation, etc.) of the downlink control information (DCI) by the PDCCH. To be more specific, the PDCCH receiving process section 215 acquires the MCS, the number of PRBs per transport block and so on, included in the DCI.

Here, the PDCCH receiving process section 215 may acquire the MCS by using an MCS field of expanded size (aspect 2.1). Also, the PDCCH receiving process section 215 may acquire the MCS by using the MCS field in the DCI and the masking of the CRC (Cyclic Redundancy Check) that is attached to the DCI (see aspect 2.1 and FIG. 16). Also, the PDCCH receiving process section 215 may acquire an operation result based on the MCS (aspect 2.2).

The modulation scheme/coding rate acquisition section 216 acquires the modulation scheme/coding rate that are applied to the PDSCH, based on the MCS acquired in the PDCCH receiving process section 215. To be more specific, the modulation scheme/coding rate acquisition section 216 acquires the modulation order and the TBS index that correspond to the MCS acquired in the PDCCH receiving process section 215, from the MCS table 219. Also, the modulation scheme/coding rate acquisition section 216 calculates the coding rate according to, for example, equation 1, based on the TBS index acquired from the TBS table 220 and the number of PRBs per transport block included in the DCI.

The PDSCH receiving process section 217 performs receiving processes (for example, demodulation, decoding, etc.) of the user data and higher layer control information by the PDSCH. To be more specific, the PDSCH receiving process section 217 modulates and encodes the PDSCH by using the modulation scheme and the coding rate that are acquired in the modulation scheme/coding rate acquisition section 216.

The CQI table 218 is the same as the CQI table 116 described earlier, and therefore will not be described again. Also, the MCS table 219 is the same as the MCS table 117 described earlier, and therefore will not be described again. The TBS table 220 is a table, in which TBS indices and TBSs to correspond to the number of PRBs per transport block are associated with each other. The TBS table 220 includes TBSs to correspond to modulation schemes of higher orders than 64 QAM (for example, 256 QAM) (FIG. 21 to FIG. 31).

As described above, with the radio communication system 1 according to the present embodiment, adaptive modulation and coding (AMC) to support modulation schemes of higher orders than 64 QAM is made possible, so that spectral efficiency improves.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosures of Japanese Patent Application No. 2013-014597, filed on Jan. 29, 2013, and Japanese Patent Application No. 2013-185184, filed on Sep. 6, 2013, including the specifications, drawings and abstracts, are incorporated herein by reference in their entirety.

The invention claimed is:

1. A user terminal comprising:
   a receiver that receives a modulation and coding scheme (MCS) index; and
   a processor that acquires a modulation order corresponding to received MCS index as a modulation order of a downlink shared channel, from a first table in which MCS indexes are associated with modulation orders including the modulation order 8 and transport block size (TBS) indexes,
   wherein a second table is provided in which MCS indexes are associated with modulation orders of less than the modulation order 8 and TBS indexes, and
   the first table is provided by puncturing a combination of a modulation order and a TBS index in the second table so that the first table and the second table are equal in a number of bits for an MCS index.

2. The user terminal according to claim 1, wherein the first table is provided by puncturing at least one of combinations of a lowest modulation order and a TBS index in the second table.

3. The user terminal according to claim 1, wherein the first table is provided by puncturing a combination of a modulation order and a TBS index in the second table, the combination being determined based on contribution to throughput.

4. The user terminal according to claim 1, wherein the processor acquires a TBS index corresponding to the received MCS index from the first table,
   the processor acquires, from a third table in which the TBS indexes are associated with numbers of physical resource blocks (PRBs) and TBSs, a TBS corresponding to the TBS index acquired from the first table and a number of PRBs allocated to the downlink shared channel, and
   in the third table, one or more TBSs corresponding to one or more TBS indexes for 256 QAM are defined.

5. A radio base station comprising:
   a processor that acquires a modulation and coding scheme (MCS) index indicating a modulation order used for modulation of a downlink shared channel from a first table in which MCS indexes are associated with modulation orders including the modulation order 8 and transport block size (TBS) indexes; and
   a transmitter that transmits the MCS index,
   wherein a second table is provided in which MCS indexes are associated with modulation orders of less than the modulation order 8 and TBS indexes, and
   the first table is provided by puncturing at least one combination of a modulation order and a TBS index in the second table so that the first table and the second table are equal in a number of bits for an MCS index.

6. The radio base station according to claim 5, wherein the first table is provided by puncturing at least one of combinations of a lowest modulation order and a TBS index in the second table.

7. The radio base station according to claim 5, wherein the first table is provided by puncturing a combination of a modulation order and a TBS index in the second table, the combination being determined based on contribution to throughput.

8. An adaptive modulation and coding method comprising the steps of:
   in a user terminal,
   receiving a modulation and coding scheme (MCS) index; and acquiring a modulation order corresponding to received MCS index as a modulation order of a downlink shared channel, from a first table in which MCS indexes are associated with modulation orders including the modulation order 8 and transport block size (TBS) indexes, and
   wherein a second table is provided in which MCS indexes are associated with modulation orders of less than the modulation order 8 and TBS indexes, and
   the first table is provided by puncturing at least one combination of a modulation order and a TBS index in the second table so that the first table and the second table are equal in a number of bits for an MCS index.

9. The user terminal according to claim 2, wherein the first table is provided by puncturing a combination of a modulation order and a TBS index in the second table, the combination being determined based on contribution to throughput.

10. The user terminal according to claim 2, wherein
    the processor acquires a TBS index corresponding to the received MCS index from the first table,
    the processor acquires, from a third table in which the TBS indexes are associated with numbers of physical resource blocks (PRBs) and TBSs, a TBS corresponding to the TBS index acquired from the first table and a number of PRBs allocated to the downlink shared channel, and
    in the third table, one or more TBSs corresponding to one or more TBS indexes for 256 QAM are defined.

11. The user terminal according to claim 3, wherein
    the processor acquires a TBS index corresponding to the received MCS index from the first table,
    the processor acquires, from a third table in which the TBS indexes are associated with numbers of physical resource blocks (PRBs) and TBSs, a TBS corresponding to the TBS index acquired from the first table and a number of PRBs allocated to the downlink shared channel, and
    in the third table, one or more TBSs corresponding to one or more TBS indexes for 256 QAM are defined.

12. The user terminal according to claim 9, wherein
    the processor acquires a TBS index corresponding to the received MCS index from the first table,
    the processor acquires, from a third table in which the TBS indexes are associated with numbers of physical resource blocks (PRBs) and TBSs, a TBS corresponding to the TBS index acquired from the first table and a number of PRBs allocated to the downlink shared channel, and
    in the third table, one or more TBSs corresponding to one or more TBS indexes for 256 QAM are defined.

13. The radio base station according to claim 6, wherein the first table is provided by puncturing a combination of a modulation order and a TBS index in the second table, the combination being determined based on contribution to throughput.

* * * * *